United States Patent
Kelly

(10) Patent No.: US 12,249,127 B1
(45) Date of Patent: Mar. 11, 2025

(54) SYSTEM AND METHOD FOR IMAGE CREATION AND PROCESSING

(71) Applicant: CSG Systems, Inc., Englewood, CO (US)

(72) Inventor: Kieran Kelly, Mountshannon (IE)

(73) Assignee: CSG Systems, Inc., Englewood, CO (US)

( * ) Notice: Subject to any disclaimer, the term of this patent is extended or adjusted under 35 U.S.C. 154(b) by 0 days.

(21) Appl. No.: 18/816,025

(22) Filed: Aug. 27, 2024

(51) Int. Cl.
*G06V 10/774* (2022.01)
*G06N 3/0464* (2023.01)
*G06Q 30/0251* (2023.01)

(52) U.S. Cl.
CPC ......... *G06V 10/774* (2022.01); *G06N 3/0464* (2023.01); *G06Q 30/0271* (2013.01)

(58) Field of Classification Search
CPC . G06V 10/774; G06N 3/0464; G06Q 30/0271
See application file for complete search history.

(56) References Cited

U.S. PATENT DOCUMENTS

| | | | |
|---|---|---|---|
| 11,947,590 B1 * | 4/2024 | Chakraborty | G06F 16/532 |
| 12,073,414 B2 * | 8/2024 | Daniel | G06N 3/09 |
| 2022/0330050 A1 * | 10/2022 | Osinski | G06N 5/01 |
| 2024/0212109 A1 * | 6/2024 | Sasaki | G06T 5/60 |

* cited by examiner

*Primary Examiner* — Bobbak Safaipour
(74) *Attorney, Agent, or Firm* — Fitch, Even, Tabin & Flannery LLP

(57) ABSTRACT

Electronic information is received. Training images are created from the received electronic information. The training images comprise a format having a plurality of pixels arranged in a matrix of rows and columns, each of the rows indicative of a time and each of the columns representing a feature characteristic, the matrix of rows and columns together forming a visual image. Subsequent to the completion of the training of the neural network, production images are applied. The production images having the same format as the training images to the trained neural network, each production image being from a different customer and pictorially presenting behavior of each different customer with respect to the telecommunication or data service. The application of the production images to the trained neural network resulting in the creation of one or more control signals by the trained neural network.

20 Claims, 19 Drawing Sheets

|              | Jan  | Feb  | Mar  | Apr  | May  | Jun  | Jul  | Aug  |
|--------------|------|------|------|------|------|------|------|------|
| Recurring Spend | 100 | 100 | 100 | 110 | 120 | 130 | 130 | 130 |
| Overage      | 0    | 0    | 0    | 10   | 20   | 30   | 0    | 0    |
| Add-on Spend | 0    | 0    | 0    | 0    | 0    | 0    | 30   | 30   |
| Overage Fee  | 0    | 0    | 0    | 1    | 2    | 3    | 0    | 0    |
| Calls        | 0    | 0    | 0    | 0    | 1    | 2    | 0    | 0    |
| Score        | 0    | 0    | 0    | -1   | -3   | -5   | 3    | -2   |
| Other Factor | 1000 | 1100 | 1233 | 1250 | 1340 | 1383 | 1457 | 1500 |
| Other Factor | 1200 | 1300 | 1400 | 1500 | 1600 | 1700 | 1800 | 1900 |
| Other Factor | -200 | -100 | 100  | -200 | 100  | -100 | 100  | -100 |

FIG. 4

SYSTEM AND METHOD FOR IMAGE CREATION AND PROCESSING

TECHNICAL FIELD

The invention relates to image creation and processing with regards to data processing applications.

BACKGROUND

Data is accessed, created by, associated with, and/or utilized by different types of actors in today's technological environment. For instance, subscribers of products or services may have a long-term relationship or engagement with another entity such as a telecommunication service and utilize or consume different types of data. An individual or entity may also be a one-time or sporadic customer of products or services and use other types of data. In still other examples, a person or other entity may be a service user, for example, by using a social media website.

In many situations, it is desirable to recognize and/or classify the data. Regardless of the type of user, various issues have arisen concerning recognizing and classifying this data. For example, in many applications, various types of rich complex data sets are created and different types of behaviors of interest can be present or represented in or by these data sets. Classification includes determining the types of activity within the data. Previous techniques for recognizing patterns in these sets and classifying the information are lacking.

Subscriber engagement of varying types (including, for example) promotional engagement is used in many situations. The goal of increased subscriber engagement might be to optimize customer satisfaction and increase sales. However, achieving these goals has proved challenging with previous approaches, with previous techniques for deciding on context-appropriate engagement proving lacking.

Many previous data processing applications also relied upon the observability of disaggregated subscriber behavior either via direct observation of population behaviors or indirectly via data sets from such populations of subscribers. However, getting access to subscriber data is problematic and is becoming more so because of evolving regulations and because of a growing awareness of the monetary value inherent in data. It is possible that these restrictions on access to data become significant barriers to future development and innovation.

BRIEF DESCRIPTION OF DRAWINGS

FIG. 4 comprises a diagram of an array used to create an image according to various embodiments of the present invention;

DETAILED DESCRIPTION

Figure 1:
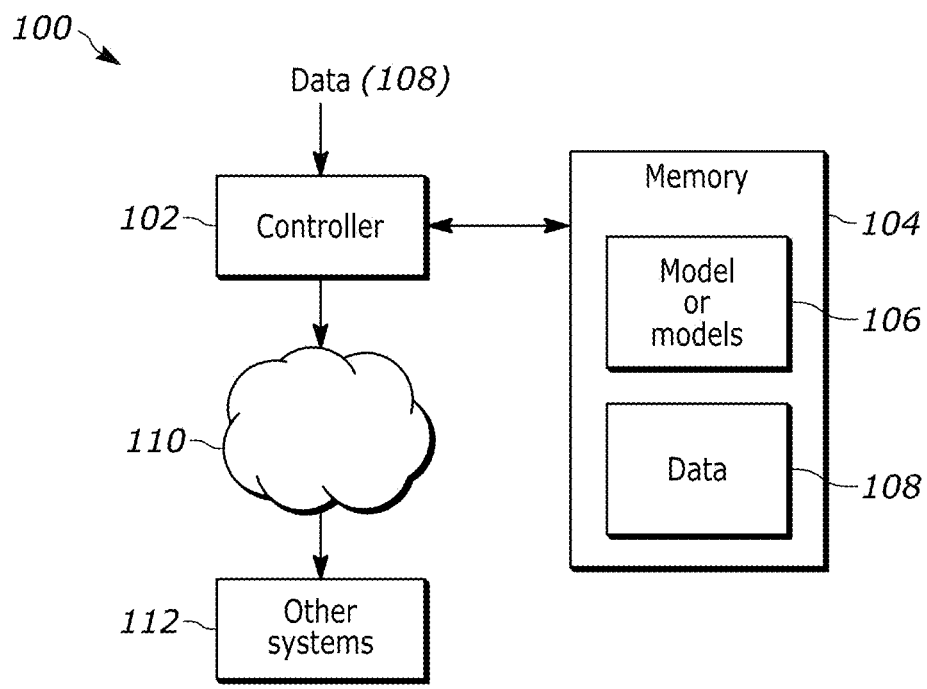
FIG. 1 comprises a system diagram according to various embodiments of the present invention.

The approaches provided herein describe various techniques for analyzing and acting upon large amounts of data such as large amounts of subscriber, customer, and other types of data. More specifically, the approaches provided herein encode user, customer, subscriber or system behavior into images and these images can be utilized for further purposes. Additionally, reinforcement learning approaches are provided that create electronic or other "nudges" that control subscriber behavior with the results being analyzed to determine whether further nudges are needed. Furthermore, large amounts of simulated subscriber data in the form of synthetic images can be created and these synthetic images used for different purposes. A virtual model or ecosystem with simulated or virtual subscribers can also be created and test data (among other inputs) applied to the model to see reactions of the virtual subscribers. Various actions can then be taken based upon the reactions.

The present approaches utilize or consume various type of data from different sources. Data may be or include individual or entity specific information. The individual may be one of a customer, subscriber or service user. Data may also include information concerning a purchase of a product or service, information describing utilization of a service, or information concerning interaction with an electronic interface such as a website.

As used herein "subscriber" or "subscribers" refers to a person, business, or other entity where a persistent relationship is established with another individual, service, or entity. For example, a person may be a subscriber to the Amazon Prime service. The relationship may be contractual in that the subscriber pays reoccurring fees for access or usage of services. Individual information or data may include credit card data or information concerning purchases may be obtained.

On the other hand, a "consumer" does not necessarily have a reoccurring, persistent, contractual and/or consistent relationship with the entity. For example, the consumer makes one-time (or non-periodic) purchases from a retail store website or pays fees as and when they access or use a service. Individual information or data obtained about this type of customer may include credit card data or information concerning other payment methods, information about purchases made, and information about services accessed or consumed.

A service user utilizes a service without necessarily purchasing items from the service or paying for the service. For example, a service user may utilize a free social media website and the individual data includes information about the individual's usage of the site.

Image recognition includes natural image processing (e.g., photo analysis, object detection and identification, and facial recognition to mention a few examples). Previous techniques for recognizing patterns in data of this complexity are lacking. Briefly, the previous approaches usually operated on much reduced data sets, thereby losing much of the data, and they usually require the implementors to identify and select a-priori the features to go into the reduced data sets, therefore requiring considerable data science skills and effort.

Many previous approaches to classification continue with techniques and practices that were developed when the nature of the computing resources (human or machine) was the primary constraint or concern. As a result, a common characteristic of previous classifiers is that feature selection and dimensionality reduction was present at the input stage, meaning that classifiers are run at reduced resolution.

In the present approaches, an image recognition pipeline (e.g. one that has been trained to recognize images) is utilized to identify and classify information that has been rendered as or into images. This pipeline may include a trained machine learning model. Based upon processing the images, classification of subscribers, customers, users, systems and/or their behavior is provided. For example, the present approaches identify types of subscribers, types of subscriber behavior, and types of system behavior to mention a few examples.

In aspects, "fingerprints" of activities to be classified are encoded into an image format. An image recognition pipeline (e.g. including or utilizing a convolutional neural network (CNN) configured for image recognition) is trained to classify types of activity of interest based on the encoded images of those activities. In other aspects, environmental data (of various types) is included in the encoded images so that an image encodes not just the core activity of interest, but also encodes data describing environmental attributes.

The approaches provided herein are applicable to many complex pattern recognition problems such as the recognition of subscriber behavior types from complex historical records extracted from one or more systems. In other examples, the recognition of system behavior types (from complex historical records extracted from one or more systems such as for anomaly classification) is provided.

In still other aspects, classification approaches are extended to take into account rich multi-variate and multi-dimensional contextual data, with the goal of improving classification accuracy. The approaches provided herein improve classification accuracy by classifying at high resolution, thereby enabling the inclusion of complex contextual data in the data set input to the classifier.

Generally speaking, the present approaches allow recognition of patterns (that represent predetermined types of system, subscriber, customer and user behavior) embedded in complex time-series data, from multiple sources where relevant, with much more resolving power than previous techniques. Furthermore, the approaches provide more automation than these previous approaches and therefore ease the amount of data science skills or personnel required. Behaviors of considerable interest hidden across multiple streams of multi-variate time-series data may be classified, recognized and/or determined. In aspects, image recognition techniques are applied to abstract images derived from user, customer, subscriber, system or environmental data.

The present approaches automate feature detection thereby reducing the need for expensive and variable-quality human data science interventions in the tuning phases. The present approaches encode code time series data (e.g., subscriber data, system data) into image formats (e.g., JPEG or PNG to mention two examples). Training images are labeled and an image recognition machine is trained (or retrained) to recognize labeled and domain-specific images.

As mentioned, images (e.g., an array of individual pixels) are created from data. In aspects, environmental, system, user, customer and subscriber data is mapped to an array data structure to be used to generate an image (e.g., a PNG image or a JPEG image). The content of the cells in the array maps to grey-scale pixels in the image. The images may also be color-coded.

In other aspects, each row of the image array may represent a time (e.g., a day or week) and each column a measured, sensed or supplied parameter. By adding more rows (e.g. more weeks or days) and more columns (more sample variables), the resolution of the picture or view of the user, customer, subscriber or system is increased.

In still other examples, capturing many variables or parameters over a large amount of time (e.g., a year or more) indicates or shows that the images of users, customers, subscribers or systems of a given type share similar features. Further, the images capture behavioral changes (e.g. growing dissatisfaction in a subscriber, increasing frailty in an overloaded system). These behavioral changes can be detected and actions taken.

In other aspects, image recognition machines are used to identify all or many of the pattern similarities. Deep learning-based image recognition machines as described herein do not care whether the images they are shown are real-world (e.g., cats, dogs, planes, etc.) or abstract (e.g., renderings of a subscriber's interactions with a service over the last year). The deep learning technology utilized herein provides several advantages over previous machine learning techniques. For example, the deep learning techniques work with large amounts of input data such as with the large amount of information embedded in a photo JPG. The deep learning techniques presented herein therefore retain information/definition compared to other previous machine learning techniques, which can be very lossy. Shown labeled inputs, the deep learning techniques deployed herein learn the significant features automatically, such that there is no need to devote data science hours to this complex, frail and skills-dependent activity.

Various other advantages are provided by the approaches provided herein. For example, the present approaches improve the quality of automating feature identification and selection technology. These approaches also reduce the time-to-market of new technology due to increased automation. The approaches presented herein additionally improve the quality of feature identification and selection technology by shifting from lossy low-resolution machine learning techniques to very high-resolution techniques. These approaches also enable very sophisticated business solutions that cannot be achieved with previous approaches and reduce the long-term need for data scientists.

As mentioned, environmental data may be included in the image. In these regards, the additive environmental data to the image may include data describing the macroeconomic environment (e.g., global, national, or local economic data), unemployment levels (e.g. national, regional, or local), prevailing weather and related events, etc., Other examples include sentiment (e.g., customer sentiment as an aggregate or individualized measure) or brand market perception. Still other examples of environmental data include market information such as reflection of a product catalog including the current number of products, statistics on catalog (e.g., min/max/avg price, etc.) Market information might also include reflections of competitors' catalog(s) or other comparative indicators. Market information might further include competitive analysis such as comparative indicators and trends.

In still other examples, the environmental information might also include specialized or particular performance metrics such as customer-care metrics (e.g. care agent response times, case resolution rates and times, customer satisfaction scores), service metrics (up-time, down-time, issue rates and severities, outage durations, etc.) and internal company or organization metrics (e.g., cases solved, response times, satisfaction ratings, internal service delivery, internal performance metrics in general such as sessions dropped). In other examples, the environmental information may include ad-hoc events such as data regarding the launch of new devices (e.g., launch of a new product such as an iPhone).

Classification of image information is performed by the present approaches at high resolution and in aspects the construction of the image is made as a combination of data describing the core activity plus data describing environmental data. Classifying at high resolution allows classifications to be made with visibility of a wide range of external signals. This allows the building of classifiers that outperform previous classifiers at least in terms of classification accuracy, classification granularity/resolution and in terms of resilience to external influences not normally included in reduced-resolution classifiers.

Reinforcement Learning (RL) is a form of Machine Learning (ML) that focuses and, in the present approaches is applied in examples to the problems of optimizing service offerings and of optimizing service user engagements, and in particular promotional engagements. One goal achieved by the approaches provided herein is to automate these types of optimization problems and solutions to these problems.

Subscriber engagement of varying types, including but not restricted to promotional engagement, is utilized. It is possible to cast engagement activities as optimization/maximization problems, where we might express goals in forms such as to optimize customer satisfaction or maximize customer average revenue per user (ARPU) or the more complex type of optimization problem where we seek the optimal balance of multiple variables (e.g. optimal balance of customer satisfaction and ARPU)

In aspects, a RL machine is integrated with an ecosystem that contains the following sub-systems and services: (1) subsystems that manage subscriber services (e.g., the Encompass or Ascendon systems manufactured and produced by CSG, Inc.), (2) a subsystem to classify these subscribers based on their activity (e.g., example classes or classifications might be churn risk, low-spend, average, and high-spend), and (3) a defined set of feedback controls on the ecosystem that the RL machine can exercise (e.g., offer a promotion of monetary value to subscriber, extend subscriber usage quota for service S by amount A, or Increase/decrease intensity of subscriber messaging for subscriber S).

Then, the RL machine is allowed to learn, essentially through trial and error, how to optimize the problem. At a high level this can be thought of as discovering the set of moves that it needs to make to move subscribers from one classification to a more desired classification (the "goal"). For example, example goals might include moving a churn risk classified subscriber to an average-classified subscriber, or moving a low-spend classified customer to an average classified customer, or moving an average classified subscriber to a high-spend classified customer, or keeping a high-spend classified customer within this classification, or moving an very unhappy classified subscriber into a very happy classified subscriber, possibly via multiple intermediate stages (e.g. mildly unhappy, neutral, mildly happy, happy, very happy).

The RL machine uses control levers (e.g., actions such as creating electronic offers or modifying electronic offers) to try and nudge the subscribers from state to state (from one classification to another classification). The RL machine automatically searches the problem space itself and seeks out the control sequences that work best.

The control levers or actions may include optimizing promotions to individual subscribers, optimizing promotions to entire cohorts, or optimizing outbound interaction patterns and intensities (individuals or cohorts). In one approach, automating the optimization of product definition and pricing could be performed in its entirety, resulting in a totally dynamic and self-tuning catalogue-free solution.

In still other aspects of the present approaches, the mining of data from populations of virtual subscribers is performed for model training and other use-cases. In examples, the extraction of data from populations of virtualized subscribers is performed for a variety of use-cases, including model training.

The virtualized subscriber base is implemented as a large population of individualized simulated entities (sims), where an entity template (also called seed data herein) exists and is defined by a set of variables, any or all of which may be random variables, with each random variable having a specific programmable probability distribution, and where the individual entities (sims) in a population are instantiated or initialized from the template, with the initialization of any random variables defining an individual being drawn at random from the relevant probability distributions so that individuals differ from each other in random ways while conforming as an ensemble to the probability distributions defined in the controlling template, these differences influencing at an individual level how the entities (sims) behave over the course of a simulation, with such behaviors being observable at the level of the individual for the purpose of extraction of disaggregated data sets and with such individualized sims forming a virtual test population or market.

In aspects, "instantiated" relates to the task of creating the control structure for one instance of an entity in the software.

In one example, a controlling template may include random variables X, Y, and Z, each defined by a specific probability distribution. When an individual sim is instantiated, it is given a private copy of the template and at this time the random variables in the private copy are initialized to random values, this initialization being governed by the probability distributions assigned to the random variables in the controlling template. Each sim therefore has a different private template. In this example X may represent the probability of a sim consuming a quantum of quota during a period, Y may represent the probability of a sim engaging with the store during a cycle when they find they have no quota remaining to use, and Z may represent the probability of a sim making a purchase from the store when they make such a visit. In this example, there are two sims, sim 1 and sim 2. For sim 1, X may be randomly set to 0.001, Y randomly set to 0.1, and Z randomly set to 0.2. For sim 2, X may be randomly set to 0.05, Y randomly set to 0.5, and Z randomly set to 0.8. The random values to which the variables are set conform to a probability distribution included in the controlling template. When the model is executed, the behavior of sim 1 and sim 2 is observed. For example, sim 1 may be observed and records made that describes the interactions of sim 1 with a store, describing visits and optional purchases. Many data utilization activities rely on the observability of subscriber behavior either via direct observation of population behaviors or indirectly via data sets collected from such populations of subscribers. Previous approaches often assumed that while individual subscriber data cannot be leveraged, due to various restrictions, statistical and aggregate measures describing population behaviors can be leveraged. Solutions based on statistical and aggregate measures lose resolution and specificity and are lacking. The present approaches decouple users from external restrictions through use of simulated populations that are grouped as a virtual ecosystem. With these present approaches the individual subscriber data can be leveraged since it is derived from a sim and is not subject to restrictions on its use. Statistical and aggregate measures describing population behaviors can also be derived from the data describing the activities of a population of sims. A simulated environment or virtual ecosystem is built that is highly parameterized. In particular, agent-based modelling (or similar techniques) is used to achieve and simulate coherent temporal behaviors amongst simulated users. The model is run, statistical measures are extracted from the simulated population and by comparing these measures with measures taken from real populations, model parameters are iteratively adapted until both populations behave in statistically similar ways. Machine learning or deep learning techniques may be used to automate the tuning of models and the tuning of elements within the system is automatic and continuous.

These approaches develop and maintain virtual populations as test markets, support test against these populations (solutions, programs (e.g. retention programs), product offerings, promotions, etc.), and extract data from these populations for activities such as model validation, model training, etc.

In other aspects, adversarial techniques (e.g. generative adversarial networks or generative adversarial networks (GANs)) are used to automate the synthesis of various types of profiles, including synthetic customer or subscriber histories, synthetic system state representations, seed data, with a variety of down-stream uses including model training.

As has been mentioned, many business activities rely on the observability of disaggregated user and customer data or system data. However, getting access to this type of data is often problematic and is becoming more so because of evolving regulation (e.g., sovereignty, privacy) and because of the growing awareness of the monetary value inherent in data (leading to commercial barriers). It is not unreasonable to foresee a future where restrictions on access to subscriber data become a significant barrier to development and innovation.

By using the present approaches, various activities can be decoupled from external restrictions through use of synthesized data, but this itself is a complex and problematic field. In these regards, complex "fingerprints" (images) of known archetypes are encoded and used to train an adversarial engine to recognize these archetypes. The adversarial engine is then used to automate the generation of synthetic images. The adversarial engine (e.g. via the loss function) is tuned to control the quality of the synthetic images being generated.

In one example implementation, logs describing subscriber activity (including features describing external context such as macro-economic indicators, etc.) are encoded in the form of images. Then, a GAN is trained for image creation to create synthetic images of similar form and content.

With respect to training data for machine learning (ML), deep learning (DL) and artificial intelligence (AI) activities, significant and often intractable barriers to development and innovation that exist today because of lack of access to suitable training data are removed, freeing us up to be more agile, innovative and creative.

EXAMPLE EMBODIMENTS

In many of these embodiments, the system includes a receiver circuit that is configured to receive electronic information relating to one or more of: individual or entity specific information, wherein individual is one of a customer, subscriber, or service user; information concerning a purchase of a product or service; information describing utilization of a service; information describing aspects of system state or behavior, or information concerning interaction with an electronic interface. Other examples are possible.

The system also includes an electronic memory and a neural network stored in the electronic memory and a control circuit coupled to the receiver circuit and the electronic memory.

The control circuit is configured to create training images from the electronic information. The training images comprise a format having a plurality of pixels arranged in a matrix of rows and columns, each of the rows indicative of a time and each of the columns representing a customer characteristic, the matrix of rows and columns together forming a visual image. It will be appreciated that the roles of the rows and columns may be exchanged.

The training images are applied to train the neural network creating a trained neural network. The training is effective to modify a structure of the neural network by adjusting weights or other structures of the neural network. Subsequent to the completion of the training of the neural network, production images having the same format as the training images are applied to the trained neural network. Each production image is from a different customer and pictorially presents behavior of each different customer with respect to a telecommunication service. The application of the production images to the trained neural network results in the creation of one or more control signals by the trained neural network.

The control signals include information indicating one or more of: a classification of each different customer, a type of behavior of each different customer, or a type of system behavior for the telecommunication service. Other examples are possible.

The one or more control signals are effective to cause an action to be performed. The action can be one or more of: control of an operation of a machine after the machine receives the one or more control signals; creation of an electronic message that is sent to a selected customer or an administrator of the telecommunication service; automatic production of a report that is electronically presented to a selected customer or an administrator of the telecommunication service; control of a switch or other physical or virtual device in a network that implements the telecommunication service; automatic addition to or modification of the set of services, products and entitlements provided to a customer or subscriber, automatic addition to or modification of a service definition or product definition, automatic creation of a new service or product definition; automatic creation of a marketing message that is electronically sent to a selected customer. Other examples of actions are possible. It will be appreciated that what constitutes a service, a product or an entitlement may vary from type of business activity to another; in examples from the telephony environment "Quad-play," constituting fixed broadband, television, fixed telephony and wireless access, is a common bundle of services often sold together as a product (e.g., Quad-play), within which various entitlements may be defined (e.g., the standard product may entitle the customer to 100 voice minutes to national numbers per month) or to which various entitlements may be added (e.g. the customer may have the option to add an additional entitlement to use X bytes of roaming data traffic per day for Y days for a price of Z$). Other examples of services, products and entitlements are possible.

In aspects, the electronic information comprises customer spend information, customer system interaction information, customer system usage information of the telecommunication service. Other examples are possible.

In other examples, the training images and the production images further include non-customer information, the non-customer information being macroeconomic information, weather information, sentiment information, market information, information about services or products, information about the system or systems, or key performance indicator information.

In some examples, the neural network is a convolutional neural network (CNN). In still other examples, the image is encoded in PNG, JPEG, or TIF format.

In other aspects, the customer characteristic is churn behavior, non-churn-behavior, fraudulent behavior, propensity to spend behavior, propensity to upgrade behavior, or propensity to accept promotions behavior. "Churn" refers to subscribers, users, or customers that end their relationship with a business, service, or some entity within a given amount of time. "Churn behavior" shows behavior of the subscriber, customer, or user that indicates directly or indirectly that they may soon drop a product or service. Fraudulent behavior refers to behaviors associated with various types of fraud, Propensity to spend behavior refers to the willingness of a subscriber, user, or customer to purchase a product or service (one-time, sporadically, or periodically). Propensity to accept promotions refers to the willingness or openness of a subscriber, customer, or user to accept or consider promotional materials (in any format) that encourage the purchase of a product or service. Propensity to accept promotions behavior shows behavior of the subscriber, customer, or user that are open to promotions and willing to accept these promotions.

In still other examples, the training images and production images include pixels that are grey-scale coded or color coded. In yet other examples, the electronic information included in the training images and production images has been mapped, normalized and/or smoothed.

In other aspects, time is a tunable parameter and may represent one or more years, one or more months, one or more weeks, one or more days, or one or more hours.

In yet other aspects, subsequent to the training further adjustments are made to the trained neural network.

Overall System

Referring now to FIG. 1, one example of a system 100 that performs the various functions described herein is described. The system 100 includes a controller 102, a memory 104 (including model or models 106 and data 108), a network 110, and other systems 112.

The controller 102 is any type of electronic processing device or devices such as a control circuit, microprocessor or server to mention three examples. The controller 102 is configured to execute electronic instructions that implement many or all of the functions described herein. These electronic instructions may be stored in the memory 104 or the controller 102 may have a separate memory for storing these instructions.

It will be appreciated that as used herein the term "controller" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. It is also understood that the controller 102 or any of its accessory devices may be virtual devices. These architectural options are well known and understood in the art and require no further description here. As mentioned, the controller 102 may be configured (for example, by using corresponding programming stored in a memory as will be well understood by those skilled in the art) to carry out one or more of the steps, actions, and/or functions described herein.

The controller 102 may be disposed at a central location and the system 100 may be a distributed system. That is, the controller 102 may be disposed at a central location such as a headquarters, call center, or the cloud to mention a few examples. In other examples, the controller 102 may be physically disposed across multiple locations. For example, the controller 102 may comprise multiple servers with each of the servers providing different functions. The multiple controllers may coordinate their actions by communicating with each other. In one case, one of these individual servers may implement the image processing functions described herein, another server may implement the synthetic image creation functions, and another server implement the RL functions. In aspects, the splitting of functions across servers allows servers of suitably specialized type and configuration to be used for each function, optimizing efficiency and cost. To give an example, one set of servers may be used to train a model and the trained model may subsequently be deployed to a different set of servers. In aspects, the splitting of the functions across multiple servers allows parallel processing to occur. That is, image creation functions can be provided at the same time as synthetic image creation functions to mention one example. When split across multiple processing devices, the individual controllers may coordinate their actions. For instance, information produced at one server (e.g., synthetic images) may be utilized or consumed by other servers (e.g., those implementing a virtual test environment). Control signals that are used to coordinate different actions may also be exchanged.

The memory 104 is any type of electronic memory device such as a random access memory, erasable programmable read only memory, any kind of database (or any combination of databases) to mention a few examples. The memory 104 may be one or more memories that are coupled together.

The model or models 106 are electronic, artificial intelligence, and/or machine learning models and/or deep learning models that are used to implement the functions described herein. For example, the model or models may be neural networks such as convolutional neural networks (CNNs). In aspects, different models 106 are provided for different purposes. For example, the model 106 described with respect to the classifier 502 may be included. In another example, any of the classifiers described herein (e.g., the classifier 902) may be one of the models 106.

As mentioned, the model or models 106 may be any AI element or structure, or combination of such elements or structures such as a convolutional neural network (CNN). Such a neural network may include a number of connected layers, nodes, and weights. In aspects, an input layer receives information. A filter pattern comprising a set of node-to-node weights is convolved with the input information thereby convolving it with all input node activations. The set of weights are applied to the corresponding input layer values and the weighted values summed to form an entry into a second layer. Areas in this second layer are likewise convolved with a different filter pattern specific to that layer and summed to obtain entries in a third layer. This continues up to a set of fully connected layers. At fully connected layers, in contrast to the convolutional layers, all upstream nodes are fully connected to all downstream nodes and all have their own individual weights (as is known to those skilled in the art), so that a filter pattern of weights is not used at these layers. The results are the output of two or more fully connected layers.

In aspects, the neural network used for the model or models 106 is trained using a cost function. Once the neural network architecture (e.g., number of layers, nodes in each layer, interconnectivity) is established, weights between connected nodes are randomly initialized. Example data is input into the network, comparisons of the output of network to known results or values associated with the input example are made, and a cost using the cost function is determined, and the cost (error) is propagated backward in network, weights in the network at each layer are adjusted, and a test for convergence is performed. When sufficiently converged, the weights are frozen and the neural network can be used. In some examples, production data (e.g., production images) are applied to the trained neural network. "Production" refers to any image or data applied to a trained neural network.

Different training data sets may be utilized according to the approaches provided herein to train the various models 106. For example, the training data sets may include information about subscriber usages, customer spend amounts, or product preferences (e.g., in the form of images as described elsewhere herein) and then an output determined (e.g., a customer reaction, behavior, or classification). As mentioned, the output can be compared to known outputs (known and verified behaviors) from the training data and adjustments made for errors. To take one specific example, training data may include amounts of data (in bytes) transferred upstream and downstream from a device or devices, spend amounts, and usage times. When the training data (e.g., training image) is applied to the neural network, a label may be attached to this data showing the proper classification for the data (e.g., the training image is a non-churn customer, subscriber, or user). After the training data is applied to the model 106, the model 106 produces what it believes is the proper classification of the type of user, subscriber, or customer. This can be compared to known classification described in the actual label applied to determine whether any adjustments need to be made to the structure of the model or models 106. For example, when an image labeled as "churn" is applied to the model 106 and the model 106 returns the classification as "non-churn," then adjustments to the model 106 can be made. Adjustments to the model 106 can be made by adjusting the weights, layers, and/or interconnections in the model 106 to mention a few examples.

The data 108 is various types of data that is used in the approaches provided herein. For example, the data may be data that is encoded into images as described herein. For example, any type of data that describes the behavior of subscribers or customers may be included. This data may, in examples, include the amount of data usage by a person, other patterns of behavior by the person, calls made, purchases made, services utilized, preferences, and other types of information. Other examples are possible.

The network 110 is any network or combination of networks that is used to transmit electronic information. For example, the network 110 may be the internet, a cellular network, a wireless network, a local area network, or combinations of these or other networks. Other examples are possible.

The other systems 112 may be other types of electronic systems. For example, the other system may be marketing systems, ordering systems, purchasing systems, inquiry systems, planning systems, or systems or combinations of systems that provide various types of services. In other examples, the other systems 112 include machines that are actuated by control signals sent by the controller 102. These systems 112 may include controllers, electronic memories, or electronic interfaces that allow or provide for interaction with users, customers, or subscribers.

In one example, a marketing system may include a controller, memory, and user interfaces where users can interact with the controller via devices such as personal computers, laptops, and smart phones. Different marketing programs (e.g., implemented as computer instructions) can be executed by the controller. For example, computer programs that create promotional materials (e.g., in the form of electronic emails, videos, or paper-based materials) to be presented to subscribers, customers, and other users may be executed. Various types of data inputs may be received and utilized by these programs.

The other systems 112 may also include or be other electronic networks. These other electronic networks may be any type of networks such as the internet, a cellular network, a wireless network, a local area network, or combinations of these or other networks. As described elsewhere herein some of the resultant actions of the controller 102 may adjust parameters, conditions, states, or actions provided by these devices. For example, the other systems 112 may include other electronic networks and these other networks may include controllers, servers, routers, gateways, or other electronic components.

The access-control profiles, routing and route-selection rules, throughput speeds, latency characteristics, data usage limits, or other parameters may be adjusted according to the approaches provided herein by control signals generated by the controller 102. For example, when the other systems 112 include electronic networks, then electronic switches, routers, or other electronic elements in one state can be changed to different states. Electronic routing switches may be physically adjusted to route information or data in a certain way. In another example, the throughput speed or transmission latencies of data may be physically reduced or allowed to be increased for certain users across the network or within certain areas of the network by altering the operation, programming, setting parameters, and/or tuning various electronic elements. In yet other aspects, electronic elements within the network are set up or configured to restrict ("choke") or not the flow of data. In still another example, electronic elements in the network may be configured to halt or prevent data or information movement when customer data limits are reached, or customer bills are unpaid.

In processing information, the controller 102 may produce control signals that include information indicating one or more of a classification of each different customer subscriber, a type of behavior of each different customer, or a type of system behavior for the telecommunication service. Other examples are possible. The one or more control signals are effective to cause an action to be performed, the action be one or more of: control of an operation of a machine after the machine receives the one or more control signals; create an electronic message that is sent to a selected customer or an administrator of the telecommunication service; automatically produce a report that is electronically presented to a selected customer or an administrator of the telecommunication service; control of a switch or other physical or virtual device in a network that implements the telecommunication service; automatic addition to or modification of a customer or subscriber service profile or entitlements, automatic addition to or modification of a service or product definition, automatic creation of a new service or product definition, or automatically create a marketing message that is electronically sent to a selected customer. Other examples of actions are possible.

Figure 2:
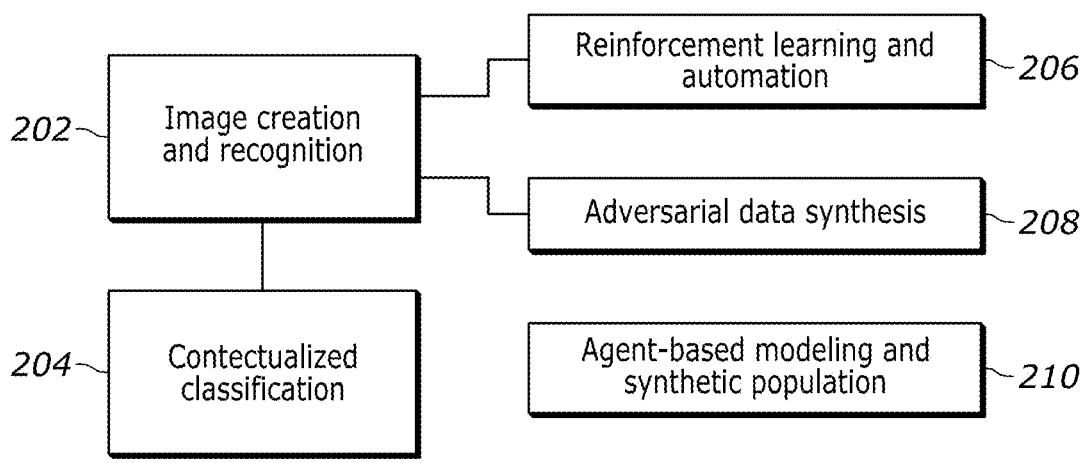
FIG. 2 comprises a diagram showing various aspects of the present invention.

Referring now to FIG. 2, examples of software modules that are used and executed by the controller 102 are described. The modules include an image recognition module 202, a contextualized classification module 204, a reinforcement learning and automation module 206, an adversarial data synthesis module 208, and an agent based modeling and synthetic population module 210. These modules may be stored in the memory 104 and executed by the controller 102.

The image recognition module 202 receives data and creates an image representative of the data. In aspects, the image includes an array of pixels arranged in rows and columns. In aspects, each row is a moment in time and each column is a characteristic (it will be appreciated that these roles can be reversed). The images represent, in one example, behavior or state of a system, or behavior or state of a subscriber, customer, or user when using or interacting with a telecommunication service, a service that provides electronic services, or a website to mention a few examples. To create this array of pixels (the image), the image recognition module 202 may receive data in the form of an array or other data structure (or it may itself create this data structure). Then, the image recognition module 202 may create the image using this information.

Once created, the images can be used for various purposes such as for training a classifier (e.g., a CNN or other machine learning model). Then, the trained classifier can be put into a "production" environment where production images (created as described herein) are applied to the trained classifier. Classifications (or other results) are produced by the trained model and can be used to take further actions. Production images refer to images created and applied after the classifier has been trained and is operating in a non-training, non-test, actual real environment.

The contextualized classification module 204 works with the image recognition module 202 and adds highly contextualized classification to the image. For example, contextualized classification module 204 adds key performance indicators or macro economic indicators to the image created by the image recognition module 202. Adding this information increases the resolution and effectiveness of the image.

The reinforcement learning and automation module 206 applies an image describing customer, subscriber, user or system to a classifier, and the classifier produces a classification, description, or other insight as to the information contained in or represented by the image. This information may be indicative of different user, customer, subscriber or system state or behaviors. The classifier then produces control nudges, which in some examples are control signals. The control signals may be sent to other entities in the system (e.g., a control system, or a marketing system, or other system).

The other entities (e.g., the marketing system) analyze the control nudges and create nudges that are then applied or sent to the customer, subscriber, user or system. For example, electronic or other types of promotional materials may be sent to the customer, subscriber, or user. The customer, subscriber, user or system receives these nudges and then reacts. Their behavior may be monitored. In aspects, subscriber, customer, user or system behavior or changes to this behavior is monitored (e.g., changes in usage of an electronic telecommunication service by a subscriber such as call or data usage may be sensed by appropriate sensors within a telecommunication network). All this sensed information representative of behavior or behavioral changes is used to create a new image, which is applied to the classifier, and the cycle repeated until the sensed behavior of the subscriber, customer, user or system is deemed satisfactory. In one class of example the reinforcement learning and automation module 206 is used to create intent-based solutions for managing subscriber, customer, user or system behavior, wherein target behaviors (the "intent") are defined for the reinforcement learning and automation module 206 and the module automates the process of moving subscriber, customer, user or system behavior as appropriate towards the intended target behavior. In aspects, a system administrator interacts with a system and sets a target outcome (the intent).

To take a few examples, the intent may be that a system is always running with a provisioned capacity for the expected traffic load, or that all customers or subscribers have an active paid-up service entitlement at all times, or that the product catalog always contains a range of products suitable for the usage patterns and spend patterns observed in the customer or subscriber base. The system automatically manages different features (e.g., elements or devices in a telephony network, catalog pricing, promotional offers) to satisfy the intent, it being understood that the process is iterative, that the intent (the "target") may never be reached, or only intermittently so, and that the goals and benefits of this type of solution can be met through the activity of continually moving towards the target. This approach removes the need for an administrator to configure the system, reduces or eliminates the need for system monitoring analysis and manual interventions, automates tasks related to optimizing system configuration, automates tasks related to catalog and pricing optimization to mention some advantages. Different AI models may be used to receive the system administrator's intent and automatically control or manage the features to implement the intent and obtain the desired outcome. Again, this all occurs without the need for further interaction from a user (once the initial intent or outcome is specified).

In one example, the controlled entity is the person. For example, it may be desirable to move the person from the "high churn risk" category to the "stay" category, possibly via multiple intermediate categories (e.g. "moderate churn risk", "low churn risk", "neutral churn risk"), or from the "stay" category to the "spend" category, again possibly via intermediate stages Patterns of nudges that move customers from one type of behavior or classification and keep them within that behavior or classification are determined. It will be appreciated that the steps described above can be performed automatically without human intervention.

The adversarial data synthesis module 208 produces synthetic or artificial images (e.g., that are not based on actual customer, subscriber, user or system data). These may be created when large amounts of data is needed or in situations where it is undesirable to allow others make inference about real-world original training subjects through inference on the behaviour of a trained system. In aspects, a discriminator is trained with real training images. "Noise" (e.g., random numbers) is applied to a synthetic image generator. The generator creates a synthetic image (based upon the noise) with a classification. This is applied to the trained discriminator, which determines if the synthetic image is acceptable (e.g., close enough to resembling an image created with real subscriber, user, customer or system data) or unacceptable (e.g., not close enough to resembling an image created with real subscriber, user, customer or system data). Based upon this determination, a further determination is made as to whether to adjust the synthetic image generator so that better (e.g. more realistic) synthesized images are created. For example, the weights may be adjusted and the result, over multiple iterations of this process, is that the image generator becomes very good at producing more realistic synthetic images. It will be appreciated that the steps described above can be performed automatically without human intervention.

The agent based modeling and synthetic population module 210 creates and/or supports virtual environments with virtual agents (subscribers, users, or customers) and can be used for various purposes. In aspects, individual agents can be modeled as a set of one or more state machines. Each individual agent (or sim) is initialized individually with a set of parameters that influence its individual behaviour, these parameters being computed from a seed profile that is shared by all agents of a specific type. The seed profile is a set of parameters, any or all of which may be random variables, with each random variable having a specific programmable probability distribution. When an individual agent in a population is instantiated or initialized from the seed profile it is given a private initialized set of parameters drawn from the seed profile, where the initial value of any random variable is drawn at random from the relevant probability distribution defined in the seed profile so that individual agents differ from each other in random ways while conforming as an ensemble to the probability distributions defined in the controlling seed profile. For example, all the agents in a population may have a probability X of defaulting on a bill, but that probability is initialized to different values, at random, for each agent in the population. Together, all the virtual agents (with their specific defined behaviors and characteristics) comprise a virtual environment or model.

This model can be executed (run) by the control circuit 102 and the results measured or observations about the model executed are sensed. The model can be used for various purposes for testing where organization-specific systems (e.g., accounting, ordering, or marketing systems to mention a few examples) apply information to the model (e.g., a price offer or promotion). Then, the model reacts (showing how new potential or test service products would fare) and actions can be taken. The reactions of the model (including the agents, individually and as an ensemble) can be observed, logged, measured, analyzed and various actions taken.

In other examples, the observed behavior of the model (including its agents, individually and as an ensemble) is monitored and applied to a reinforcement learning engine (as described herein). The reinforcement learning engine produces control nudges to the systems. The other systems (e.g., a marketing system) then react (e.g., modify their price offers or promotions) and these are again applied to the model. The process can be repeated until a set of adequate nudges is determined (based on observing the behavior of the model) and then these nudges can be used in real-world situations with actual customers, users, subscribers, services or systems. It will be appreciated that the steps described above can be performed automatically without human intervention.

Image Recognition as a Classifier for Non-Image Data

Figure 3:
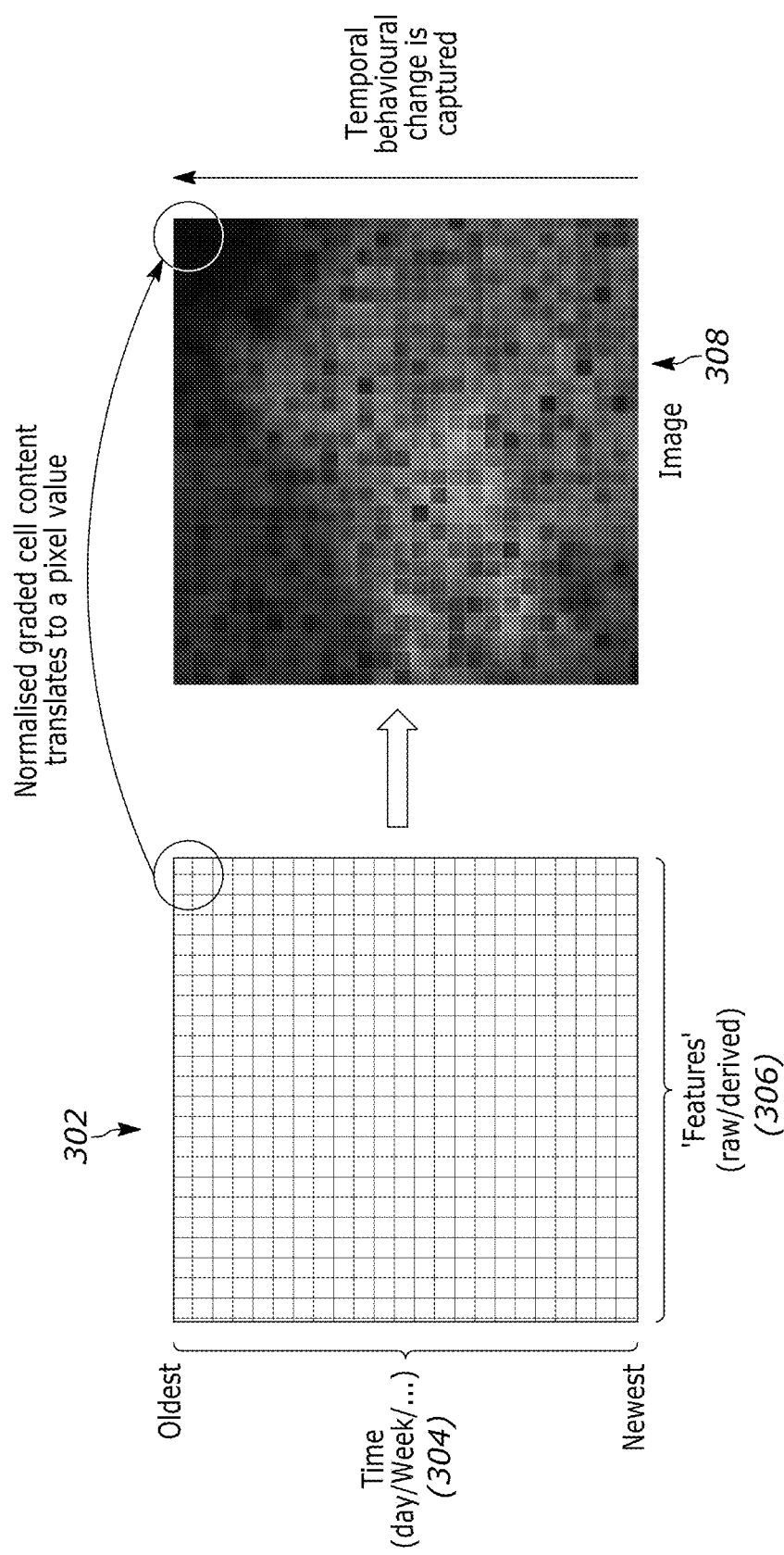
FIG. 3 comprises a diagram showing an approach for image creation according to various embodiments of the present invention.

Referring now to FIG. 3, one example of an approach for image creation is described. An array 302 is created. The array 302 has rows 304 and columns 306. The rows 304 each represent a time (e.g., a day, week, hour, or minute to mention a few examples). The columns 306 represent a feature relating to an individual, system, business or other entity.

The data in the array 302 may be or include individual or entity specific information. The individual may be one of a customer, subscriber or service user. Data may also include information concerning a purchase of a product or service, information concerning use of a service or product, or information concerning interaction with an electronic interface such as a website. Other examples are possible.

The array 302 may be a data structure with each element (row number, column number) being a cell. The array 302 is converted (e.g., by the controller 102) into an image format 308. The image format 308 may be any type of image format such as a PNG, TIF or JPEG image formats to mention a few examples. The conversion process between the array 302 and image 308 maps values in each cell in the data structure to one or more values in the image format (e.g. there may be one-to-one mapping to a grey-scale value for grey-scale images, or a one-to many mapping for color-coded images). A mapping table or a mapping function may be used for these purposes. When rows (or columns) represent time temporal behavioral changes are captured by the image 308, The array 302 may correspond exactly to the image 308 (e.g., each cell in the array corresponds to exactly one corresponding pixel in the image 308). Common image manipulation techniques may subsequently be applied to the image 308 that change the values in the cells (e.g. contrast modification) or that change the number of cells in the image (e.g. size reduction).

Figure 19:
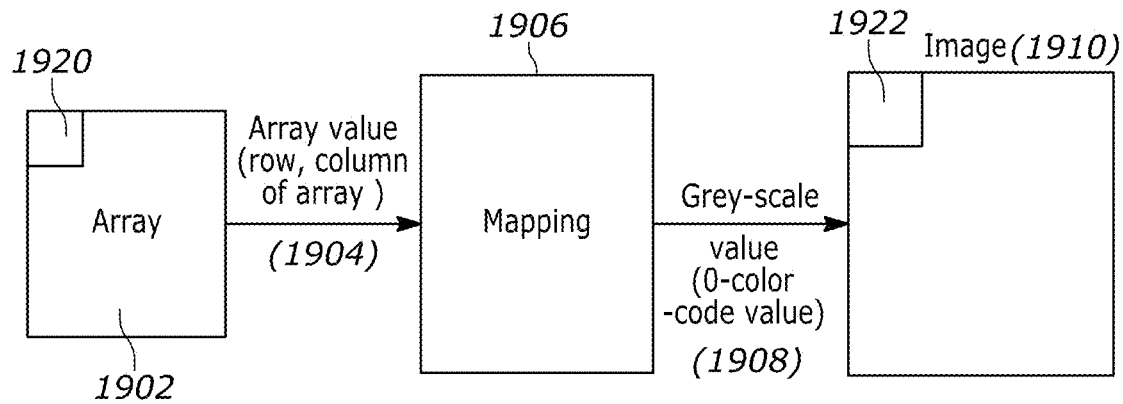
FIG. 19 comprises a flowchart of an approach for creation of an image according to various embodiments of the present invention.

In one example of the creation of an image, control logic and/or a neural network is used. Referring now to FIG. 19, each array value 1904 (e.g., each element of the array, the element being identified by row and column number) of the array is applied to a mapping table or function 1906 and a grey-scale value 1908 (or color coded value) is produced and inserted as a pixel in the image 1910. For example, array element 1920 (identified as row 1, column 1 in the array 1902) is applied to the mapping table or function 1906. The mapping table or function 1906 converts this value to a grey-scale value. For example, if element 1920 shows a first value (e.g., 20), the grey-scale value may be mapped to 100. If element 1920 shows a second value (e.g., 50), the grey-scale value is mapped to 200. The grey-scale value is applied to or inserted into or as pixel 1922 in the image 1910. This type of mapping is performed for all array elements in the array 1902 until the image 1910 is filled or complete. As has been described herein, columns (or rows) may represent particular variables and it will be appreciated that different mapping functions may be applied to different features. Although in this example there is a one-to-one correspondence between elements in the array 1902 and pixels in the image 1910, it will be appreciated that in other examples there is not a one-to-one correspondence (e.g., one element in the array 1902 may correspond to a range of elements in the image 1910 and vice versa).

Referring now to FIG. 4, one example of an array or matrix 400 of cells used in the creation of images from data in the cells is described. The example of FIG. 4 may be used to generate a PNG image (or other type of image). The array 400 includes rows 402, 404, 406, 408, 410, 412, 414, 416, 418, and 420. In this case, the row 402 represents reoccurring spend, row 406 is overage, row 408 is add-on spend, 410 is overage fee, row 412 is calls, row 414 is a score, and rows 416, 418, and 420 are other factors. The rows represent a different parameter associated with a particular individual. The array also includes columns 422, 424, 426, 428, 430, 432, 434, and 436 and each of the columns represent a month. In one example, the cell in the upper left corner represents that the customer had a reoccurring spend of 100 in January.

Figure 5:
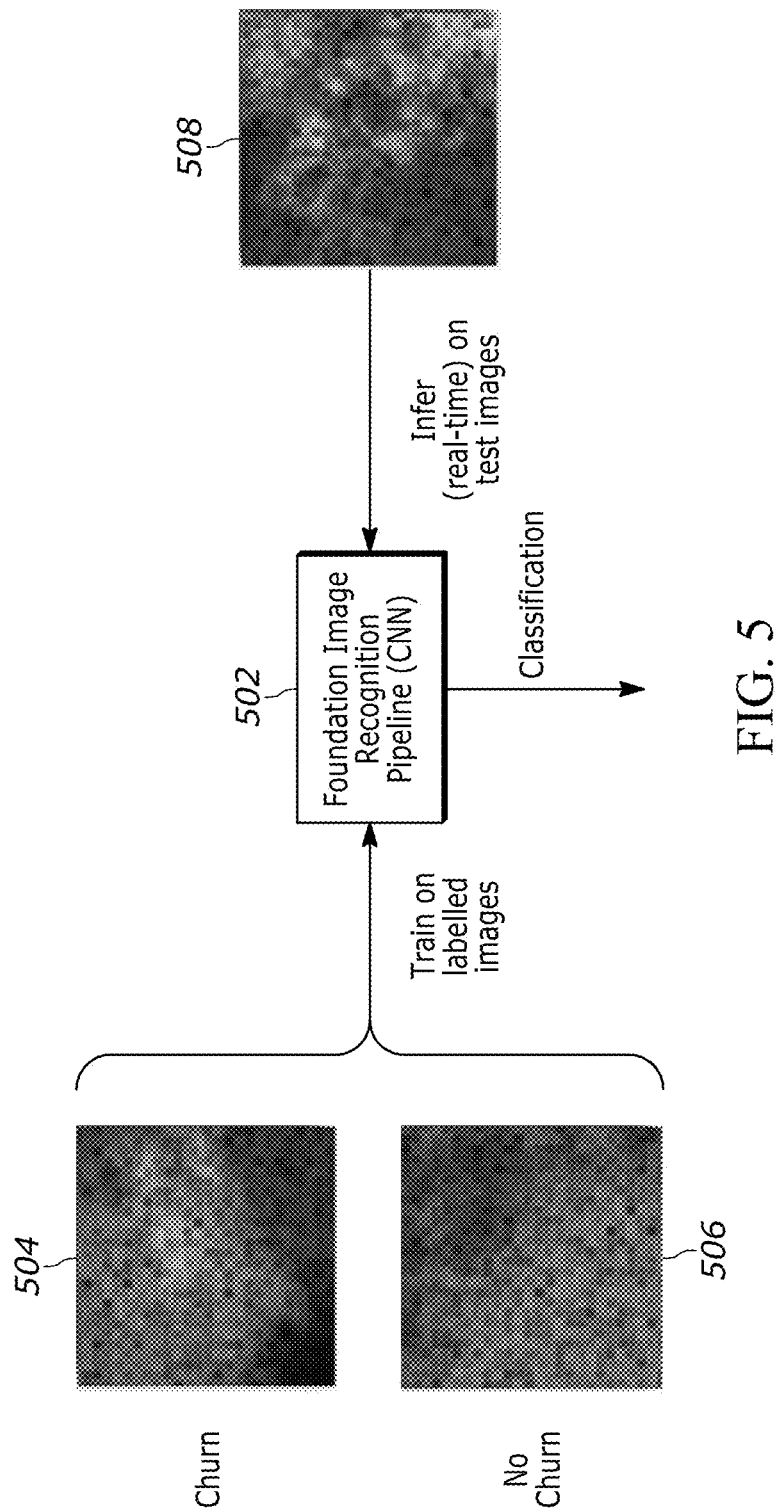
FIG. 5 comprises a diagram showing an approach for image creation according to various embodiments of the present invention.

Referring now to FIG. 5, another example of the approaches provided herein is described. The system uses a model 502 (that may be included in an image processing pipeline and be a CNN model). Test images are applied to the model 502. For example, images 504 show subscribers, customers, or users exhibiting a churn behavior and images 506 are used to show customers, subscribers, or users exhibiting non-churn behavior. Together the images 504 and 506 form a training set and are labeled electronically as churn or non-churn images as appropriate. In training, the outputs of the model 502 are monitored upon application of training image to see if the correct result is detected. If the output is wrong, corrections to the model 502 are made. For example, weights in the model 503 are adjusted. This process continues until satisfactory results are determined and then the model 502 is viewed as being trained.

After training is completed, production images are applied to the trained model 502. In one example, the trained model 502 acts as a classifier (by applying to the model images representing customer, subscriber, user or system behavior is classified or determined). For example, the classification may be whether the customer is a churn or non-churn individual to mention two examples.

Figure 6:
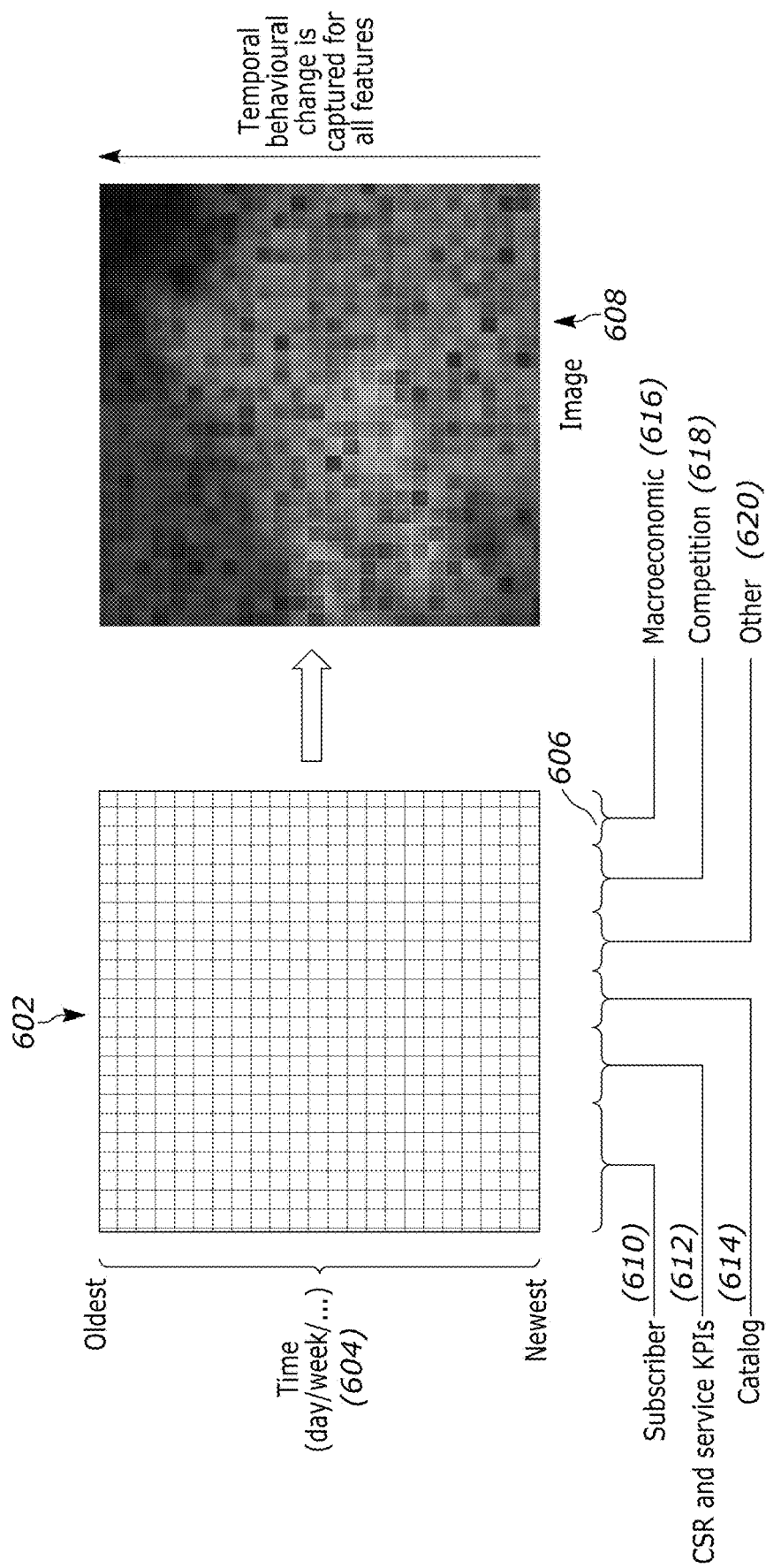
FIG. 6 comprises a diagram showing another approach for image creation according to various embodiments of the present invention.

Referring now to FIG. 6, another example of an approach for image creation is described. An array 602 is created. The array 602 has rows 604 and columns 606 and each cell includes information (e.g., numeric values). The rows 604 each represent a time (e.g., a day, week, hour, or minute to mention a few examples). The columns 606 represent feature information 610 relating to an individual, business or other entity and in this case (as compared to the example of FIG. 3) and other non-individual or non-subscriber information 612, 614, 616, 618, and 620.

The data 610 may be individual or entity specific information. The individual may be one of a customer, subscriber or service user. Data may also include information concerning a purchase of a product or service, information concerning use of a service or product, or information concerning interaction with an electronic interface such as a website. Other examples are possible.

The content of the cells in the array 602 maps to pixels in the image 608 that is created. By adding more columns (e.g., representing additional weeks or days) and more rows (sample variables) the resolution of the states and behaviors captured is increased. Capturing many variables over a long amount of time (e.g., a year or more) effectively captures complex and potentially unknown relationships between variables and across time and captures changes such as subscriber, customer or user behavioral changes (e.g. growing dissatisfaction in a subscriber) or environmentally-driven changes (e.g. increasing frailty in an increasingly overloaded system). Using images to represent large amounts of data in this way increases the probability that signals, patterns and relationships of interest are preserved and present for classification tasks, in contrast to existing approaches that shed data prior to classification. Image recognition machines are used to recognize these signals, patterns and relationships and are much better than humans at image recognition tasks since humans are not able to perceive subtle changes in pattern.

The column 612 may represent key performance indicators. The column 614 may represent catalog information. The column 616 may represent macroeconomic information. The column 618 may represent competitor information (e.g. information describing market perceptions and the competitive surface (catalog, pricing, offers, promotions, etc.). The column 620 may represent other information. This information changes over time. For example, the column 616 may represent the unemployment rate that changes (from row-to-row) over time.

Figure 7:
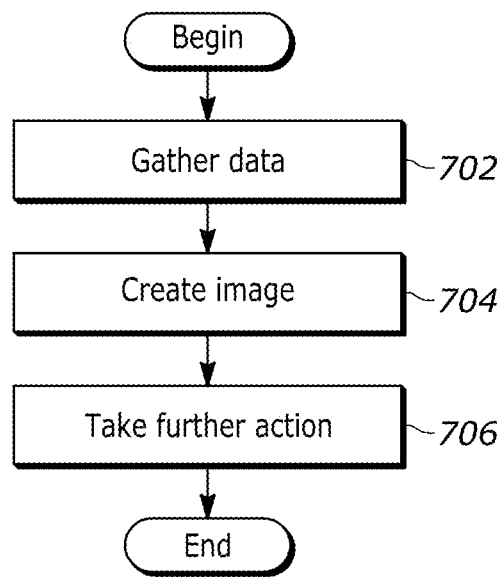
FIG. 7 comprises a flowchart of approaches according to various embodiments of the present invention.

Referring now to FIG. 7, one example of an approach for encoding images is described. At step 702, the data is gathered and put into an array. The array has rows and columns. In aspects, the rows represent a time and the columns a feature. A feature relates to state or behavior of an individual whether the individual is a subscriber, customer, or service user, or of a system or system component, or of some external data as has been previously described (e.g. macroeconomic data) It will be appreciated that the function of the rows and the columns can be interchanged. For example, the columns can represent the time and the rows the features. An example of this type of implementation is shown in FIG. 4 and it will be appreciated that in this sense the terms "rows" and "columns" are interchangeable.

At step 704, an image is created. In aspects, cells in an array as described above are directly mapped to grey-scale pixels in the image. For example, mapping rules or functions are consulted. Based upon the value of a particular cell in the array, a corresponding grey scale value is determined. A pixel with this grey scale value is inserted in the image. In example, the grey-scale value is an integer number. Lower numbers may represent lighter pixels while larger values represent darker pixels.

At step 706, the image is used with a further action. In examples, the image may be used to train a CNN or other artificial intelligence (AI) model. Once the model is trained, production images may be applied to the model and the model produces further actions. For example, the model may be used to create control signals.

Figure 8:
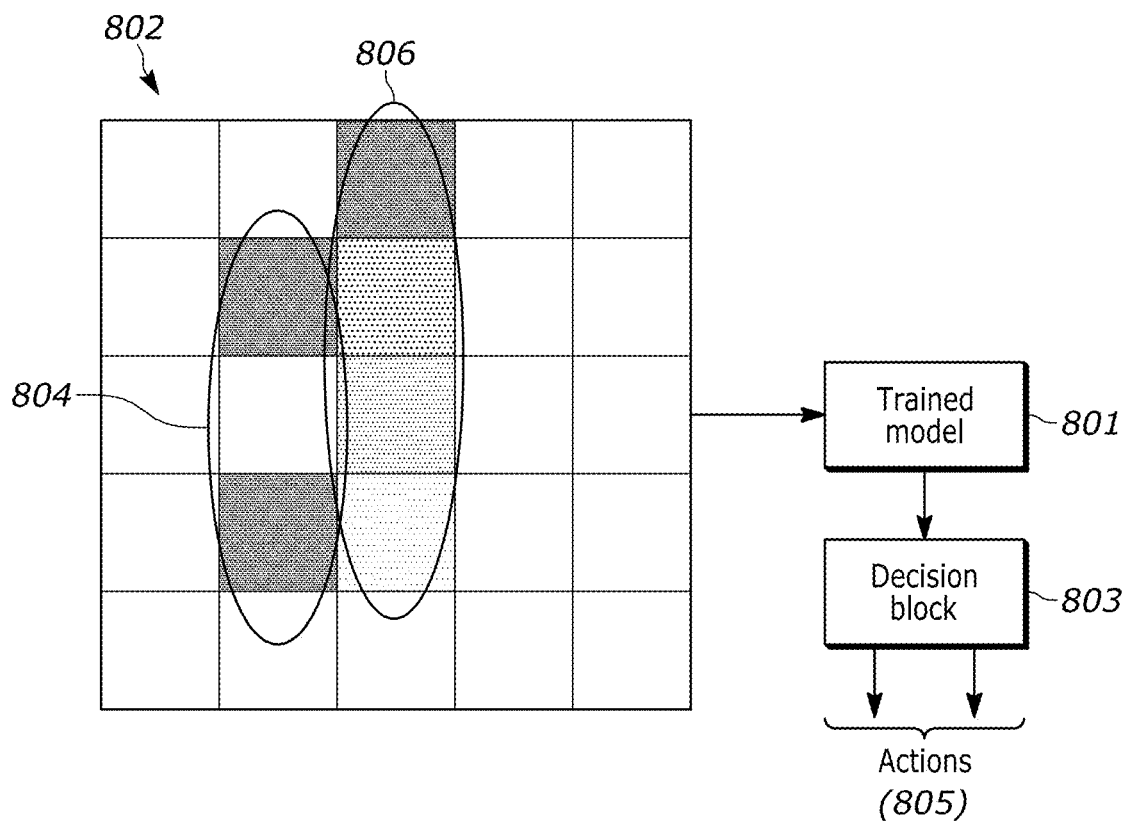
FIG. 8 comprises a diagram showing an images with different behaviors embedded in the image according to various embodiments of the present invention.

Referring now to FIG. 8, one example of determining behavior changes of individuals is described. An image 802 includes rows or columns. A first area 804 of the image represents a certain customer behavior or characteristic (e.g., matching a pattern representing churn behavior). A second area 806 of the image represents another type of behavior (e.g., increasing dissatisfaction). The image 802 may be applied to a trained model 801. The trained model 801 produces results or outputs, for example classifying the individual or individual's behavior (e.g., churn and/or dissatisfied).

As mentioned, the trained model 801 has been previously trained. The training set may include training images that are labeled. For example, a training image may be used and labeled as showing churn behavior. The outputs of the model 801 upon application of training image are monitored to see if the correct result is detected. If the output is wrong, corrections to the model 801 are made. For example, weights in the model 801 are adjusted. This process continues until satisfactory results are determined and then the model 801 is viewed as being trained.

These results may be further analyzed and further actions 805 determined by a decisions block 803. In some examples, the decision block 803 is incorporated into the model 801. For example, if the model 801 finds a first behavior and a second behavior as being present, then a first action may be determined by the decision block 803. If the model 801 finds a first behavior not present and a second behavior as being present, then a second action may be determined by the decision block 803. If the model 801 finds a first behavior is present and a second behavior as not being present, then a third action may be determined by the decision block 803. If the model 801 finds a first behavior not present and a second behavior as not being present, then a fourth action may be determined by the decision block 803. The actions may be the same or different.

Figure 20:
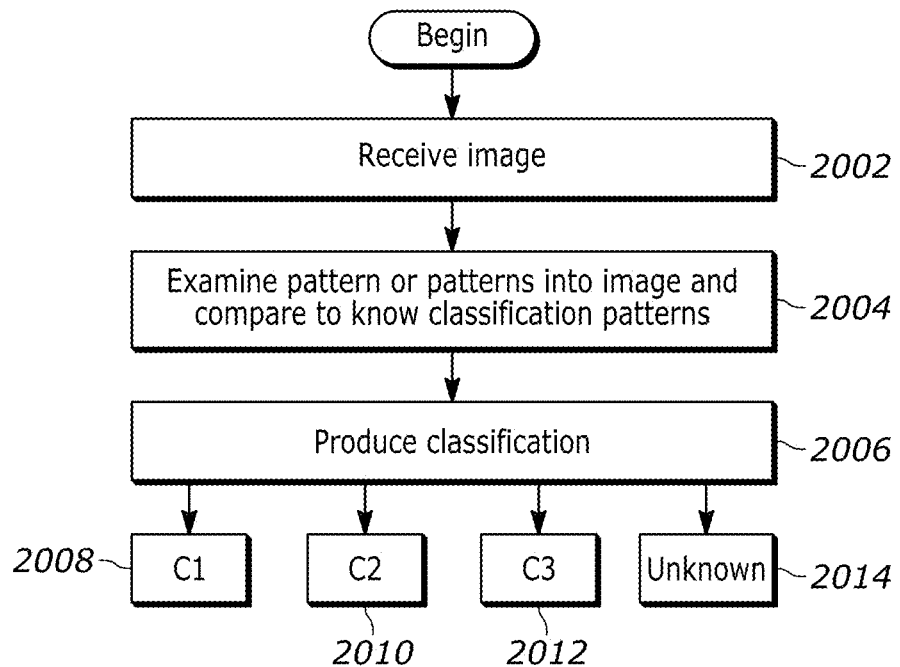
FIG. 20 comprises a flowchart of an example of the operation of a classifier according to various embodiments of the present invention.

Referring now to FIG. 20, one example of how a trained classifier (e.g., the classifier 502) may determine a classification is described. It will be appreciated that this example shows a flowchart but that this logic can be implemented in the form of a neural network such as a CNN where the structure of the neural network performs these functions. It will also be appreciated that this approach can be implemented in any combination of computer software and hardware. When a CNN or other neural network is used, the CNN may have various layers, nodes, weights, and/or interconnections that are configured to implement the logic described with respect to FIG. 20.

At step 2002, the image is received. In examples and when a CNN is used, this may be at the input layer of the CNN.

At step 2004, the image is analyzed. The classifier examines patterns it finds in the image and compares these to known patterns in known examples (e.g., from the training data). In examples and when a CNN is used, this may be performed at or by multiple layers of the CNN. Based upon the results, a classification is determined at step 2006.

The classification may be a first classification 2008, a second classification 2010, a third classification 2012, or an unknown classification 2014. These steps may be performed by multiple layers of a CNN including at an output layer.

Reinforcement Learning

Figure 9:
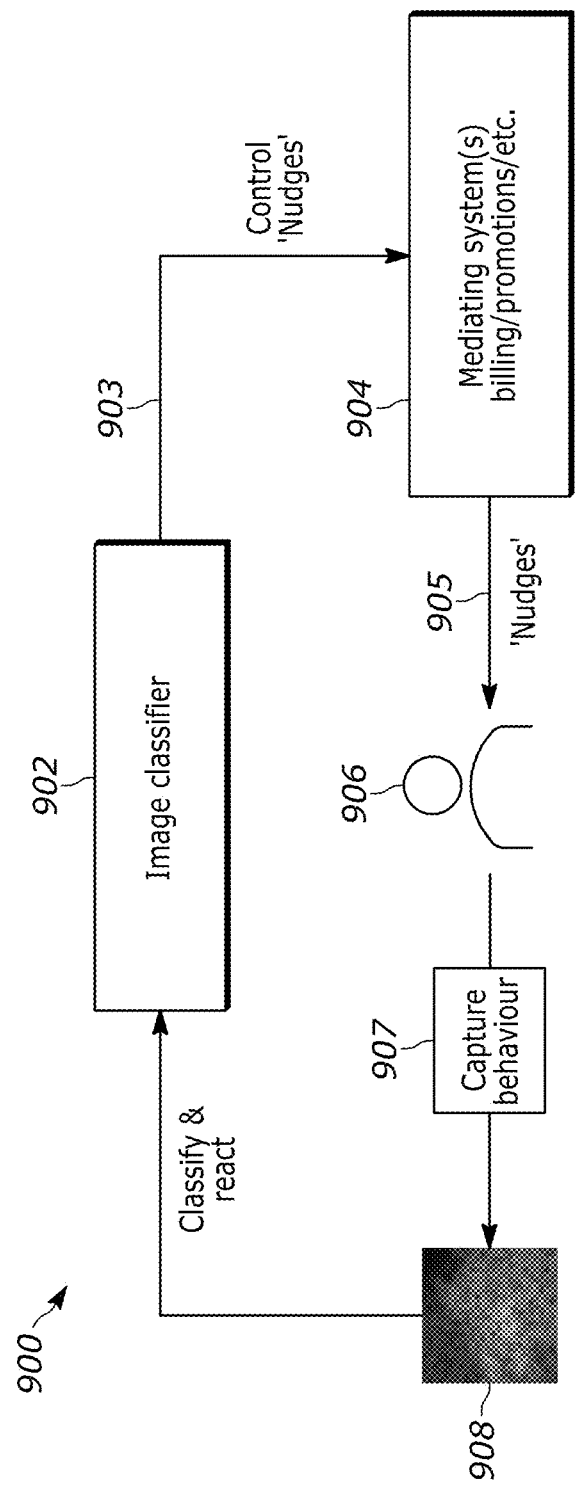
FIG. 9 comprises a diagram showing and approach for reinforcement learning according to various embodiments of the present invention.

Referring now to FIG. 9, one example of a system 900 that utilizes reinforcement learning to perform various functions is described. The system 900 includes an image classifier 902, mediating systems 904, a controlled person or entity 906, and an image capture device 907 that produces images 908.

The image classifier 902 is a trained model such as a CNN. The image classifier 902 is configured to classify images and respond with control nudges 903 that may be, in one form, electronic control signals. For example, the control nudges 903 may be electronic control signals that are a response or reaction to the classification that has been determined. The control signals interact with, control operations with, are analyzed by, and/or processed by the mediating systems 904 to produce the nudges 905.

In one example, the control nudges 903 may describe the classification determined. In other examples, the control nudges 903 include descriptions of actions, for example, actions that may be required to move a person from a churn classification to a non-churn classification.

The mediating systems 904 may be any type of electronic system and/or organizational system. For example, the mediating systems 904 may be accounting systems, billing systems, promotional systems, or marketing systems to mention a few examples. These systems may have processors, electronic devices, neural networks (or other machine learning elements or structures) and may interact with humans. As mentioned, the mediating systems 904 produce the nudges 905.

The nudges 905 may take a large number of forms. The nudges 905 may be electronic communications (e.g., email, text messages), other forms of electronic signals (e.g., electronic control signals), advertising (in the form of email, paper mail, radio advertisements, web advertisements, television advertisements), price changes, price offers (e.g., in electronic form) and electronic promotional materials to mention a few examples. If the control nudges 903 are suggestions then the mediating systems may analyze these suggestions, accept the suggestions, create new suggestions, and/or ignore the suggestions to mention a few possibilities.

A controlled person or entity 906 is the object of the nudges. The controlled person or entity 906 may be a human, group of humans, or machine (e.g., a robot, automated vehicle, or processing device to mention a few examples).

The nudges 905 interact with the controlled person or entity 906. The controlled person or entity 906 produces actions. These actions are sensed by sensors (not shown in FIG. 9) and the gathered data is the type of data that has been described elsewhere herein. The image capture device 907 receives the data and creates images 908. The image capture device 907 sends the images 908 back to the image classifier 902.

In one example of the operation of the system of FIG. 9, the image 908 created by the image capture device 907 is applied to a classifier 902. The classifier 902 produces control nudges 903, which are received and processed by the mediating systems 904. The mediating systems 904 analyze, consider and/or react to produce the nudges 905. The controlled person or entity 906 reacts to the nudges (with behavior), the behavior is sensed in terms of new data, and a new image is created that captures the behavior. The new image is applied to the classifier 902 and the same steps described above is repeated. This process continues until satisfactory results are detected by the classifier 902.

In one example, it may be desired to move the person from the "churn" category to the "non-churn" category or from the "stay" category to the "spend" category, with a specific transition potentially via multiple intermediate categories as has been described herein. The goal, in one example, is to find patterns of nudges that move customers and keep them there in that category. Once the classifier determines that the correct category has been achieved, then execution may be halted.

Figure 10:
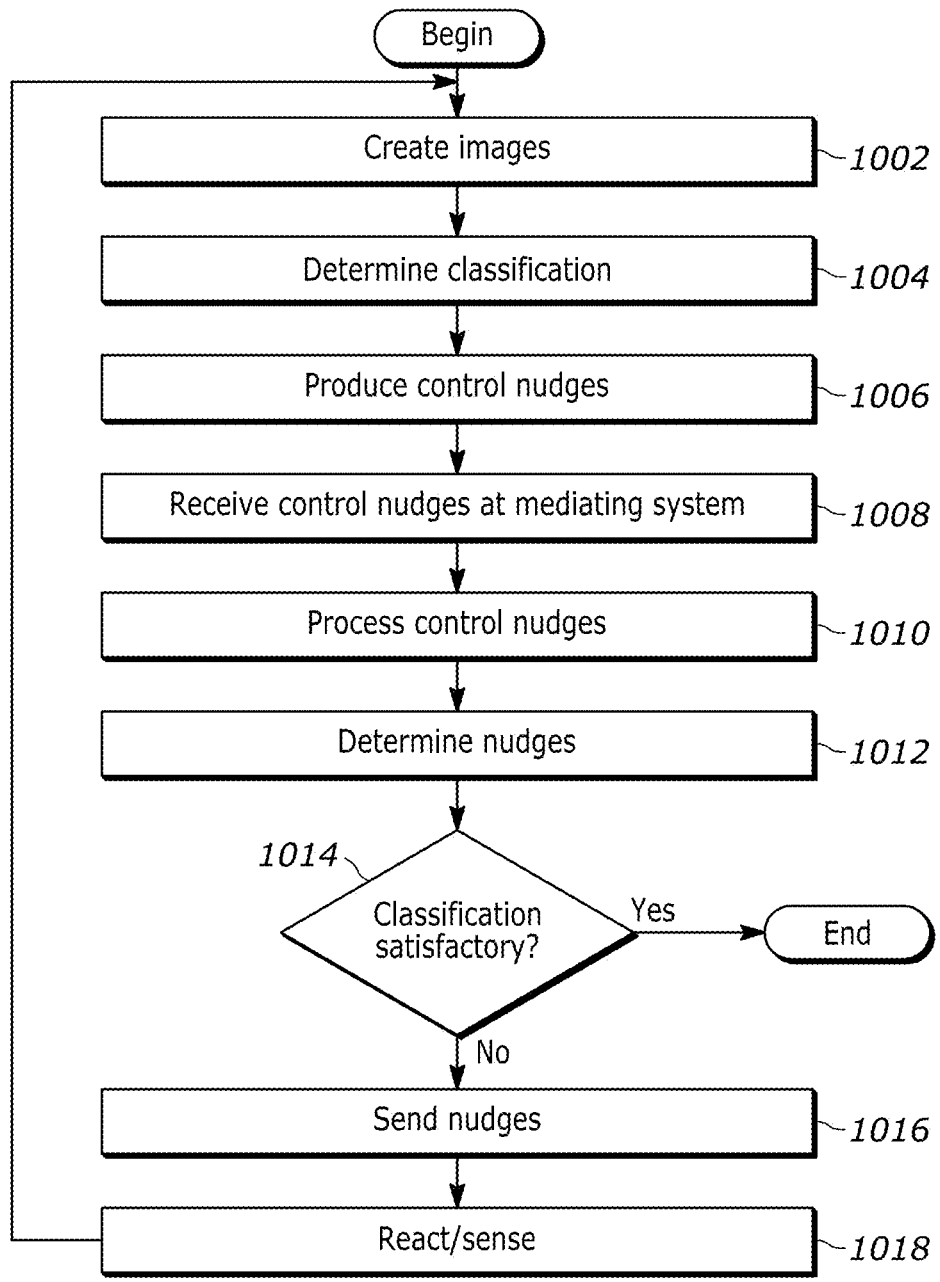
FIG. 10 comprises a flowchart of an approach for reinforcement learning according to various embodiments of the present invention.

Referring now to FIG. 10, one approach at reinforcement learning is described. At step 1002, images are created from data (as has been described elsewhere herein) and the images are supplied to a classifier. The images may be created from data from real subscribers, users, or customers or may be synthetic images as described elsewhere herein.

At step 1004, the classifier determines a classification for the image. At step 1006, the classifier produces control nudges. The control nudges may include the classification or other information related to the contents of the image. This also may be accomplished with other circuitry for example by a control circuit or controller that is executing computer software.

At step 1008, the control nudges are received at mediating systems such as marketing system, billing systems, accounting systems or promotional systems to mention a few examples. At step 1010, the mediating systems analyze, process, or otherwise consider the control nudges. At step 1012, nudges (in the form of electronic communications (e.g., email, text messages), other forms of electronic signals (e.g., electronic control signals), advertising (e.g., in the form of email, paper mail, radio advertisements, web advertisements, television advertisements), product definitions, pricing, price offers, or promotions are created.

At step 1014, a determination may be made whether the classification and other information received from the classifier (or other sources) is satisfactory. If satisfactory then execution ends. If not satisfactory, then control continues at step 1016. By satisfactory, it is meant that a determination is made from information in the control nudges whether the customer, subscriber, or user is in a state, classification, or behavior that is acceptable. For example, an acceptable classification may be that the customer, user, or subscriber is exhibiting non-churn behavior, or that a system is in a stable state.

At step 1016, the nudges are sent to the controlled person or entity and at step 1018 the controlled entity or human reacts and exhibits behavior that is captured by sensors at step 1020 and then control returns to step 1002.

Figure 21:
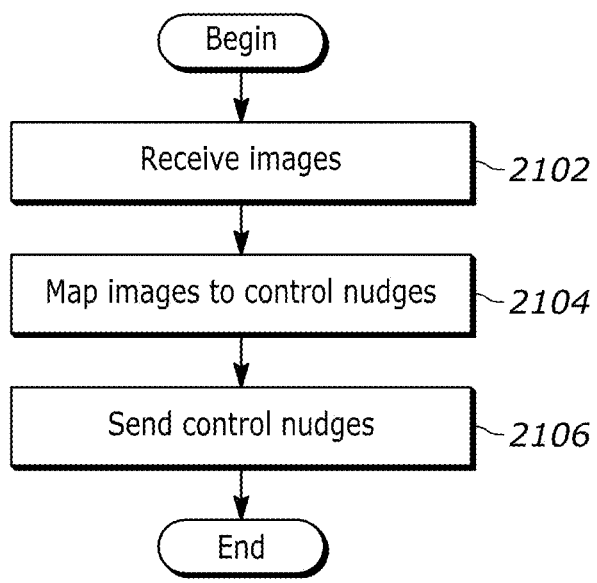
FIG. 21 comprises a flowchart of an example of an operation of a classifier that produces control nudges according to various embodiments of the present invention.

Referring now to FIG. 21, one example of how a trained classifier (e.g., the classifier 902) may determine a classification is described. It will be appreciated that this example shows a flowchart but that this logic can be implemented in the form of a neural network such as a CNN where the structure of the neural network performs these functions. It will also be appreciated that this approach can be implemented in any combination of computer software and hardware.

At step 2102, the image is received. In examples and when a CNN is used, this may be at the input layer of the CNN.

At step 2104, the image is analyzed. The classifier examines patterns it finds in the image and compares these to known patterns in known examples (e.g., from the training data). In examples and when a CNN is used, this may be performed at or by multiple layers of the CNN. Based upon the results, a classification is determined at step 2006. The classifier maps certain patterns into certain control nudges. For example, when a first pattern is detected, this may map to a first control nudge. When a second pattern is detected, this may map to a second control nudge, and so forth.

At step 2106, the control nudges are sent to mediating system 1904. These steps may be performed by multiple layers of a CNN including an output layer.

Agent-Based Modeling

Referring now to FIG. 11, FIG. 12, FIG. 13, and FIG. 14 examples of agent based modeling are described. The virtual models (also referred to as ecosystems or a virtual ecosystem) described may be implemented by a controller or control circuit and represented as data structures, machine learning models (e.g., CNNs), computer software, computer hardware, or combinations of these elements. This structure allows testing to be performed using, for example, virtual populations. Synthetic data, in the form of images (described elsewhere herein), may be used to define and initialize the personalities of the individuals in a virtual population Synthetic data may be extracted from individuals in a virtual population, by monitoring and recording the behaviors of these individuals in simulation, and represented in images ("synthetic images") for various purposes (e.g., model training) as has been described elsewhere herein. For example, synthetic images describing behaviors can be applied to billing, accounting, promotion, or marketing systems. These systems can generate, for example, promotions or price offers that can be applied to the virtual model. The virtual model can react and the reactions are monitored. The promotion or price offer can be automatically updated based upon the results or observations.

In each of these examples, a virtual ecosystem 1104 includes a simulated population of virtual agents or users (also called sims). Seed data (or a seed profile or template) 1102 attaches to each instance of simulated agents (or sims). The virtual instances (sims) in the virtual ecosystem 1104 can be described by state machines and implemented with data structures, computer software, and/or machine learning models such as neural networks. The seed data for each sim is different, e.g., each sim has a different template or profile but the variables in the template are, in aspects, set to different values and these values themselves may in some cases be interpretable as random variables governed by specific probability distributions These state machines transition from state-to-state based upon rules associated with the simulated users. The seed profile 1102 is used to initialize the individuality of a particular simulated user (e.g., behaviors that are particular to a particular virtual user such as spend amounts or data usage) with the behaviors of a simulated user each being controlled by a set of parameters that are initialized at random according to governing probability distributions defined in the seed profile. When the virtual ecosystem 1104 is electronically executed or run, simulated users (sims or virtual agents) of the virtual ecosystem 1104 have reactions to the data that can be sensed or monitored. For example, when the virtual ecosystem 1104 is executed the virtual users change states based upon the rules for simulated users and the seed profile 1102. Since the seed profile 1102 is different for different virtual users, and since the seed profile can include values that are probabilities, random factors influence sim behaviours and state transitions and different reactions are created. In aspects and as mentioned, the reactions can be changes in state or the production or creation of outputs (e.g., a simulated user upon execution of the virtual ecosystem 1104 may produce an output value, state, or other parameter that is representative of an action).

Data and services from different sources can be used or consumed by the simulated users and utilized in the simulation as the virtual ecosystem 1104 is executed. The data may be in a variety of different forms or formats such as accounting data, billing data, resource usage information, or marketing information to mention a few examples.

In examples, the seed profile 1102 might be created from a synthetic image as described elsewhere herein. For example, the synthetic image describes behavior of the sims and may be generated by adversarial data synthesis 208. Looking at the rows and the columns of an example synthetic image, simulated user A made x voice calls and used y bytes of data at a particular time. Each instance (each simulated agent or user) has a different seed data profile. To take one example, simulated user A may have a probability X of defaulting on a bill, while the probability of other simulated agents defaulting are different. Again, multiple seed profiles are used, but in aspects the variables are the same for each and the values of the variables are randomized and in at least some examples totally different. A controlling template (not shown) may be associated with all the individualized templates and include probability distributions used or controlling the values of the variables.

In aspects and as mentioned, each seed profile (entity template) 1102 for each sim exists and is defined by a set of variables, some or all of which may be random variables, with each random variable having a specific programmable probability distribution. Also as mentioned, individual entities (sims) in a population are instantiated or initialized from the particular template that attaches to a specific sim, with the initialization of any random variables defining an individual being drawn at random from the relevant distributions so that individuals differ from each other in random ways while conforming as an ensemble to the probability distributions defined in the controlling template, these differences influencing at an individual level how the entities (sims) behave over the course of a simulation, with such behaviors being observable at the level of the individual for the purpose of extraction of disaggregated data sets and that can be used as a virtual test market.

As described above and in one example, the seed profile 1102 (controlling template) may include random variables X, Y, and Z, each defined by a specific probability distribution. X may represent the probability of a sim consuming a quantum of quota during a period, Y may represent the probability of a sim engaging with the store during a cycle when they find they have no quota remaining to use, and Z may represent the probability of a sim making a purchase from the store when they make such a visit.

Figure 11:
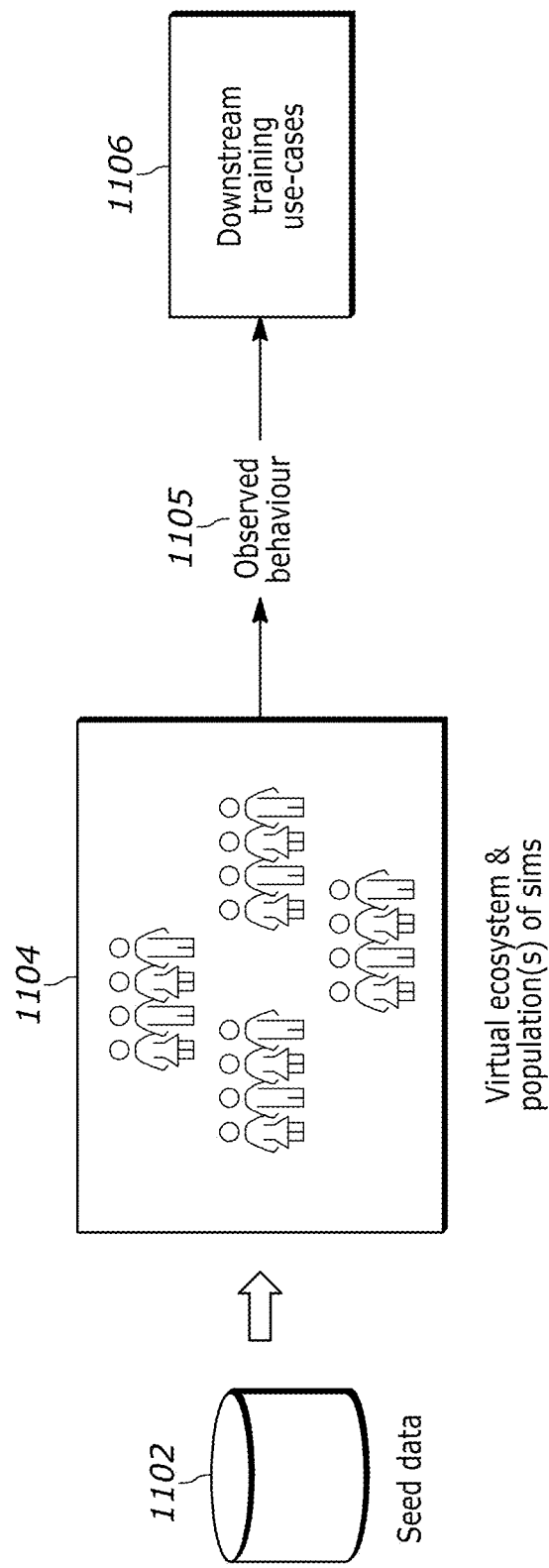
FIG. 11 comprises a diagram showing virtual populations and approaches for using the same according to various embodiments of the present invention.

In another example of the operation of FIG. 11, observed behavior 1105 is obtained as or after the virtual ecosystem 1104 is executed. In one example of the operation of the system of FIG. 11, the observed behavior 1105 is used for downstream training use cases. For example, the information gathered may indicate that under certain conditions certain simulated users will make a call. This can be used for marketing purposes and can be used to train other machine learning networks (e.g., CNNs). In examples, the behavior is sensed by sensors coupled to a controller as the virtual ecosystem 1104 is executed. For instance, sensors in a network may indicate network usage by a subscriber, customer, or user. Applying data to the entities of the ecosystem 1104 causes the ecosystem 1104 to run or execute. That is, the individual virtual agents react to the data and these reactions can be observed. The data can be from actual or real customers, subscribers, or users or can be "test" data (e.g., information from synthetic images that are created according to the synthetic image creation processes provided herein).

Figure 12:
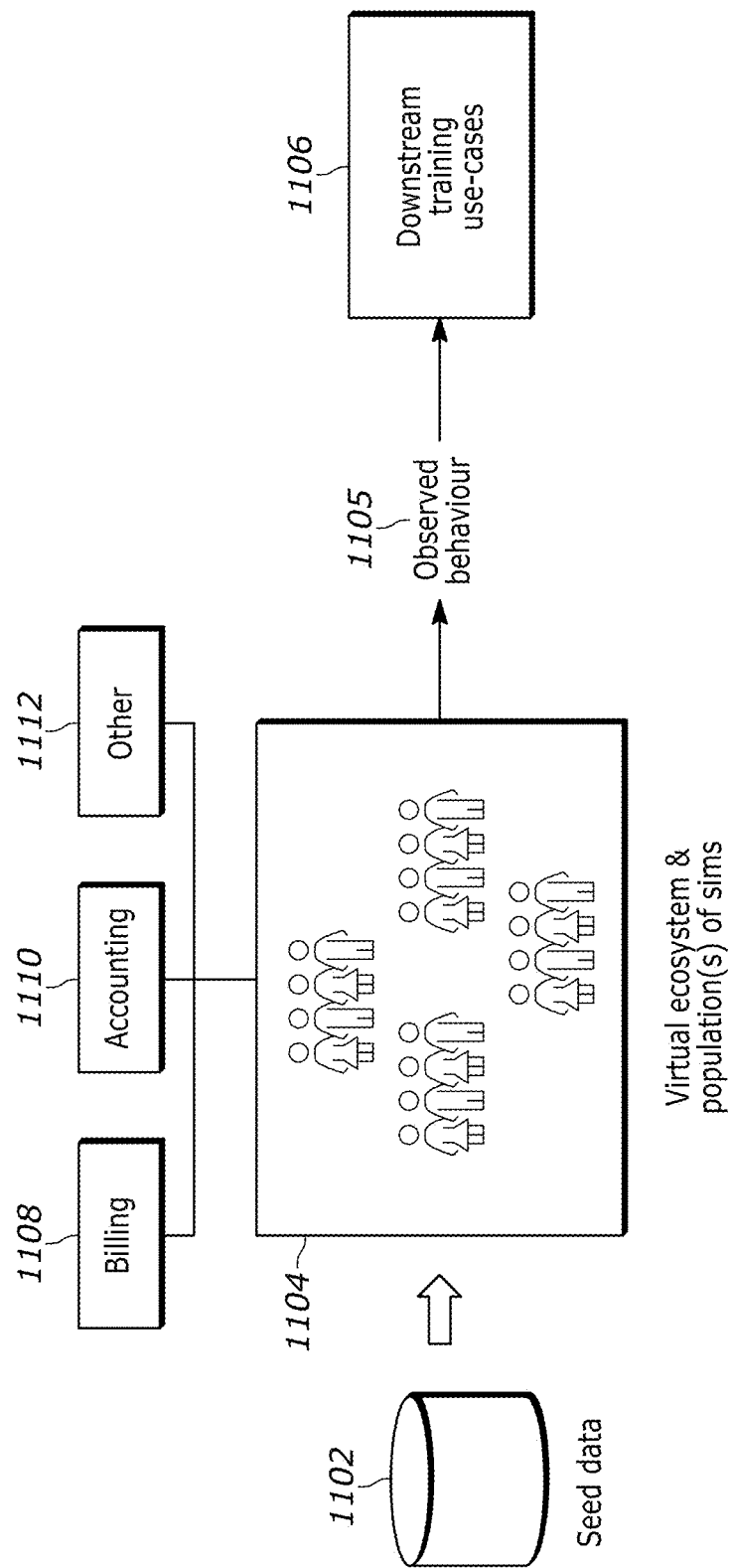
FIG. 12 comprises a diagram showing virtual populations and other approaches for using the same according to various embodiments of the present invention.

In the example of FIG. 12, external systems 1108, 1110, and 1112 supply data or serve online services to the virtual ecosystem 1104 for use in simulations. Billing system 1108 supplies billing information such as information about purchases. Accounting system 1110 supplies information about account balances. Other systems 1112 may include other types of systems. In one example of the operation of the system of FIG. 12, external systems 1108, 1110, and 1112 supply actual or test data to the virtual ecosystem 1104. The virtual ecosystem 1104 is executed and observed behavior 1105 is obtained and used as described above for downstream training use cases.

Figure 13:
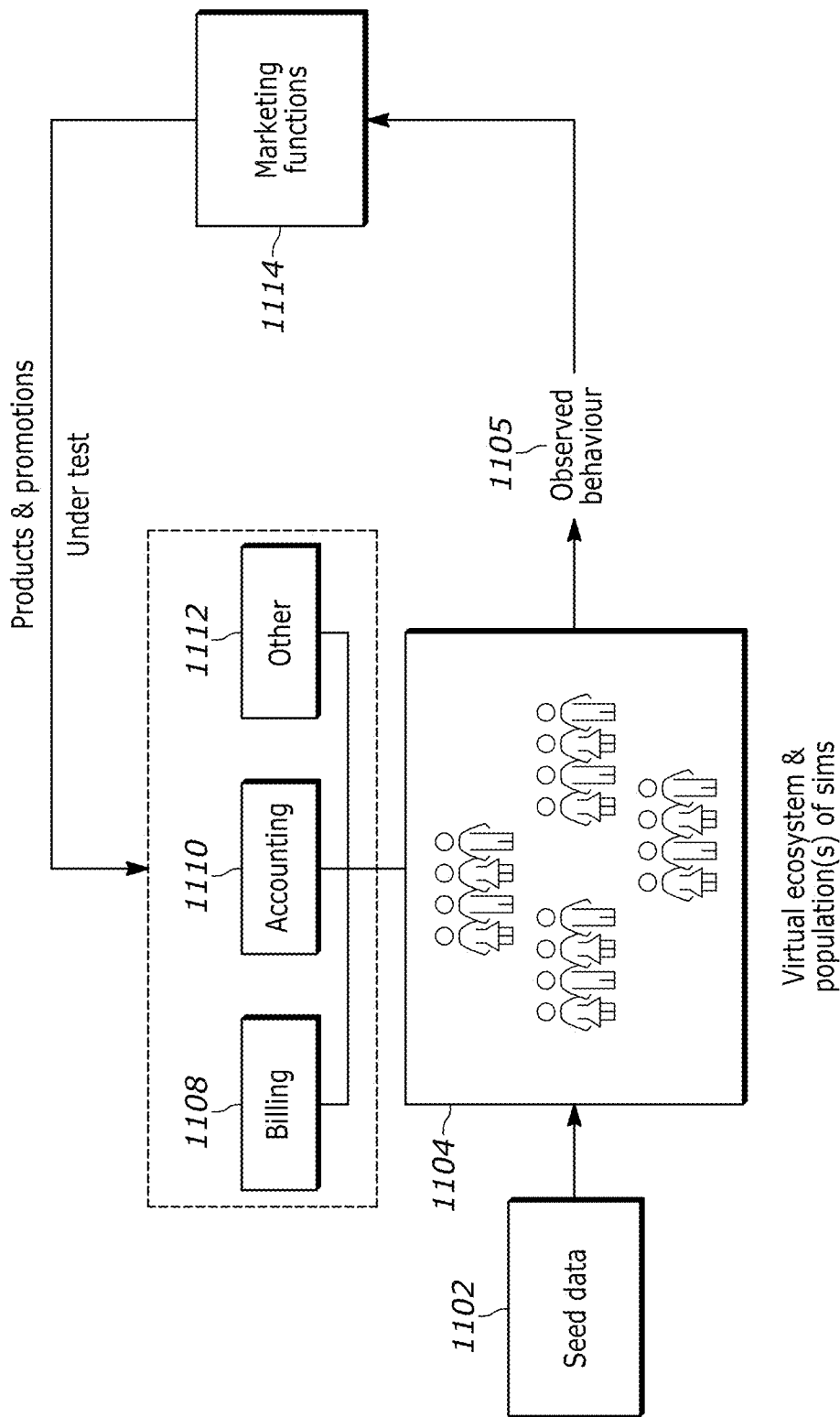
FIG. 13 comprises a diagram showing virtual populations and still other approaches for using the same according to various embodiments of the present invention.

The example of FIG. 13 is similar to the examples of FIG. 11 and FIG. 12 except that the downstream training use cases 1106 is replaced with marketing functions 1114. The marketing functions 1114 may include the creation or modification of product offerings, or the creation of marketing promotions, marketing materials, and the like. The marketing functions may in aspects be implemented or provided as combinations of computer software and hardware, machine learning models (such as neural networks) and also include human interactions. In one example of the operation of the system of FIG. 13, the marketing functions 1116 could create, form, or originate a price offer or promotion for a particular test, simulated, or virtual product. The price offer is applied electronically to the systems 1108, 1110, and 1112 to see how new "service" or "product" would fare. This action creates data that flows to the virtual ecosystem 1104. The virtual ecosystem 1104 is executed and observed results 1105 obtained. The observed results 1105 can be analyzed. For example, it can be determined whether any of the sims accepted the offer and, considering that more than one product or offer may be marketed to the test market at any given time, the relative attractiveness of the offer can be assessed. Based upon the observed results, then the offer may be removed, changed or updated and the process repeated.

Figure 14:
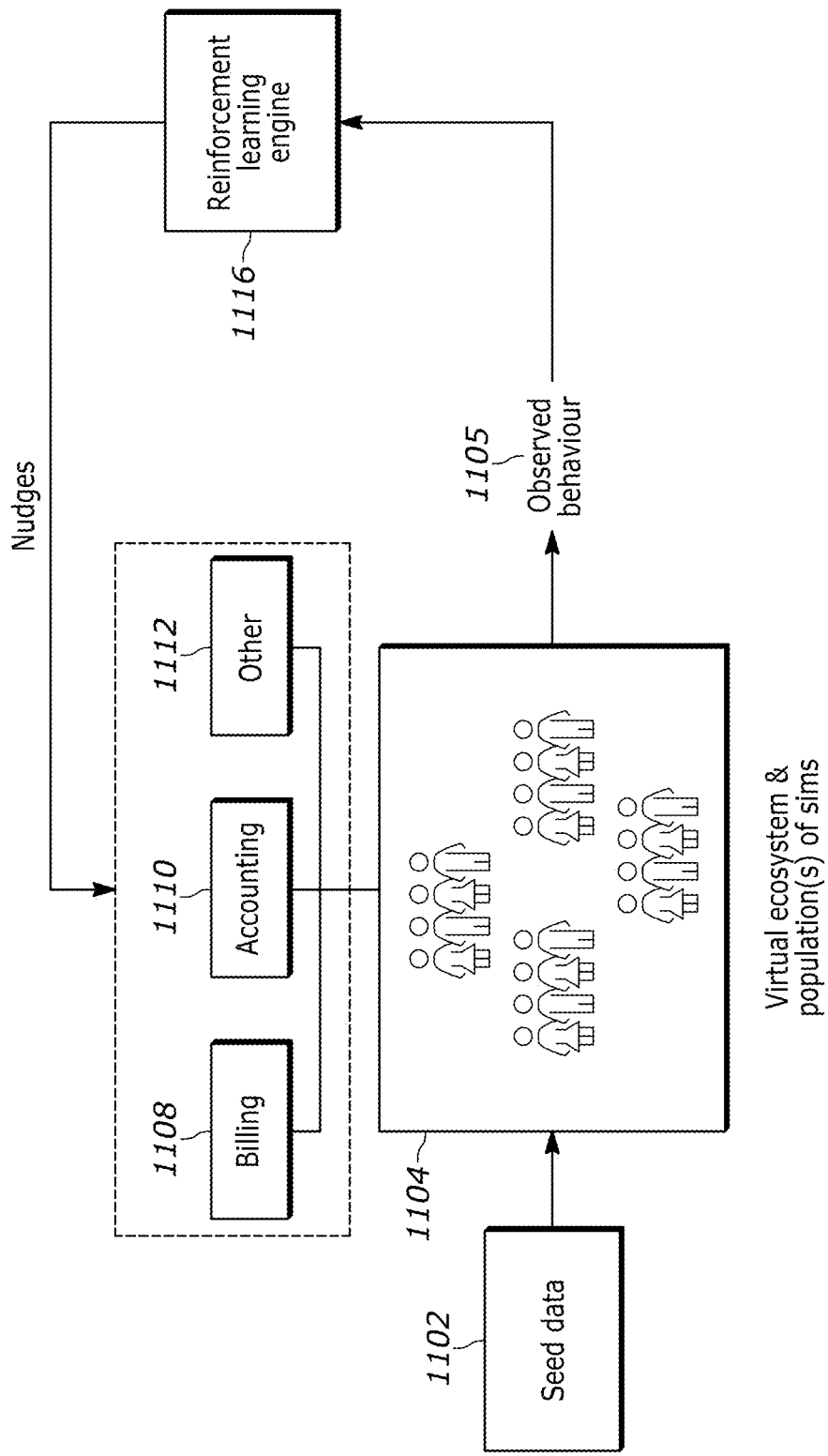
FIG. 14 comprises a diagram showing virtual populations and approaches for using the same according to various embodiments of the present invention.

The example of FIG. 14 is similar to the example of FIG. 13 except that the marketing functions 1114 are replaced with a reinforcement learning engine 1116. In one example of the operation of the system of FIG. 14, the virtual ecosystem 1104 is executed and observed behavior 1105 is obtained from the virtual agents. The reinforcement learning engine 1116 produces nudges to the systems 1108, 1110, and 1112. The systems 1108, 1110, and 1112 electronically react to create data or information that is applied to the virtual ecosystem 1104. The virtual ecosystem 1104 is again executed and observed behavior 1105 of the sims obtained. This is sent back to the reinforcement learning engine 1116 and it may be determined whether to continue the process. The operation and structure of the reinforcement learning engine 1116 has been described above.

Figure 15:
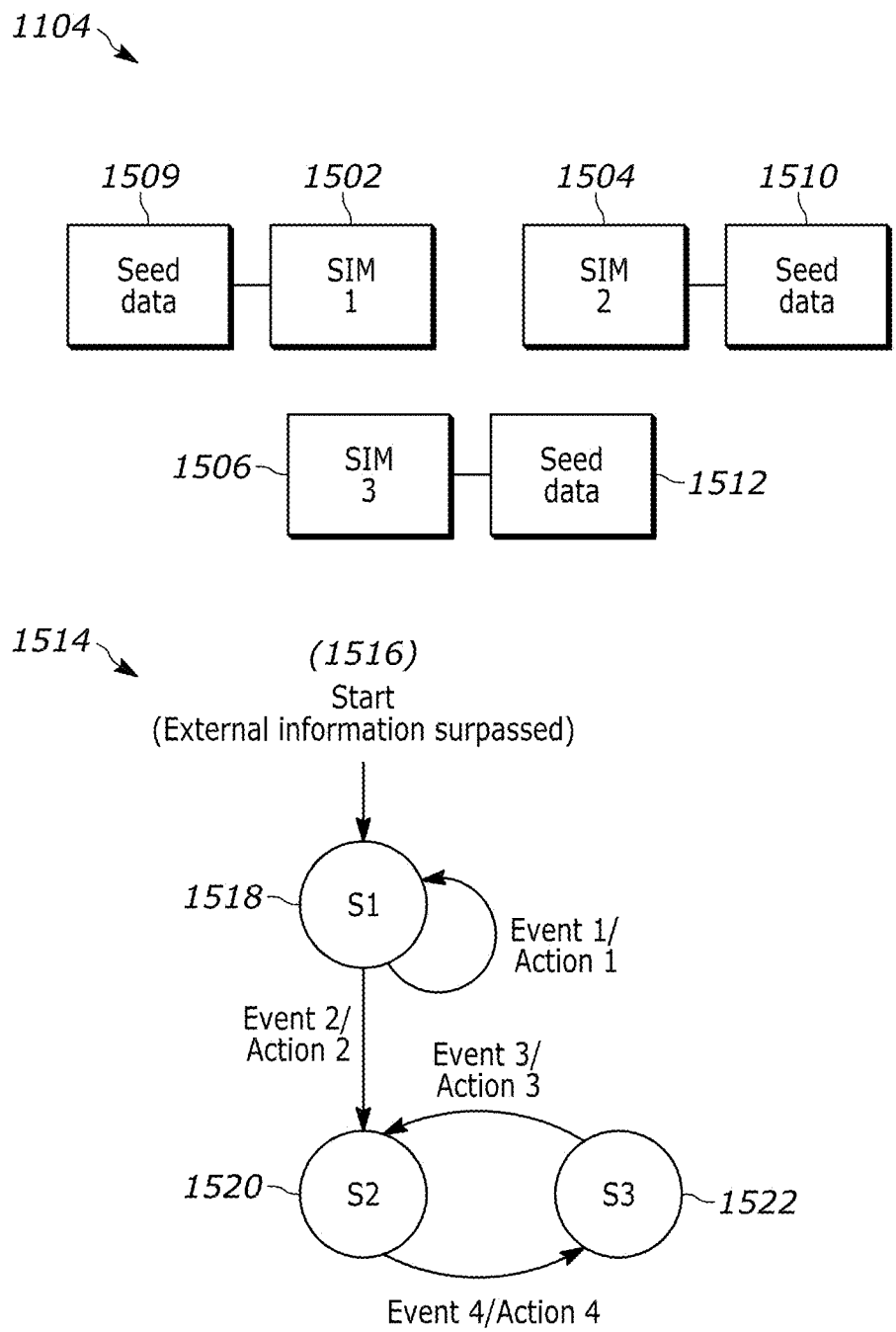
FIG. 15 comprises a diagram of a model of virtual populations according to various embodiments of the present invention.

Referring now to FIG. 15, another example of a virtual ecosystem 1104 is described. The virtual ecosystem 1104 includes sims 1502, 1504, and 1506. The sims 1502, 1504 and 1506 are associated with seed data 1508, 1510, and 1512. The sims 1502, 1504, and 1506 share a common state transition diagram 1514. The state transition diagram 1514 specifies that the states start at a starting point 1516, then transition between states S1 (1518), S2 (1520) and S3 (1522). The sims are supplied with external information at the starting point and the information can come from the systems described above. In a simulation, each state may process information creating an event and resulting in an action. For example, different data may be applied to the state S1 (1518). An algorithm may consider what the sim would do in this situation taking into account the particular seed data, which itself can include random variables or seed parameters selected at random. For example, the seed data may indicate the user has a propensity to make a large amount of calls if the price per call is below a threshold, and processing of the seed data at a decision point in simulation may indicate that an event (a call) takes place and a transition to state S2. The states are kept track of by the controller. The actions are kept track of by a controller. These are the observed results 1105 described above.

Figure 16:
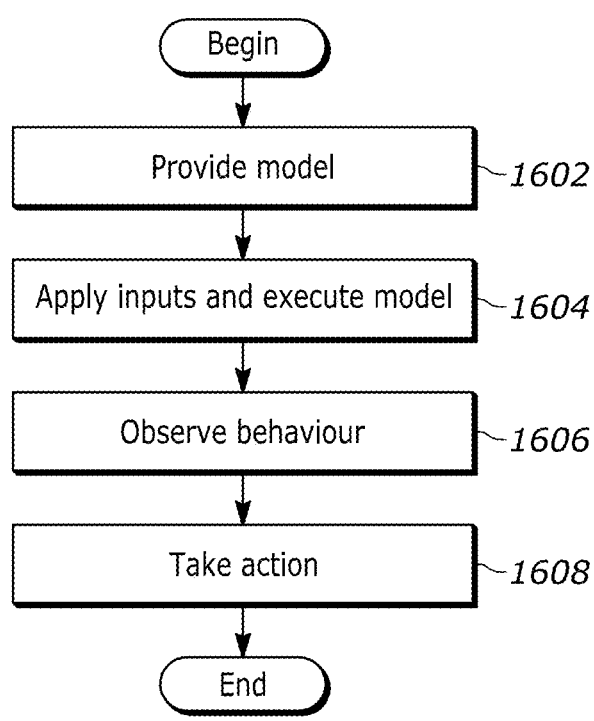
FIG. 16 comprises a flowchart executing a virtual population model according to various embodiments of the present invention.

Referring now to FIG. 16, one example of these approaches using a virtual ecosystem 1104 is described. At step 1602, a model is provided. The model includes virtualized sims (e.g., subscribers). Each of the virtualized subscribers has associated seed data, the seed data being a profile of the subscriber that makes them unique, the model being executable;

At step 1604, inputs are applied to the model and executing the model, the inputs could be testing data, or inputs from external systems to mention two examples.

At step 1606, the behavior of some entity or entities is observed. This may be accomplished by monitoring sensor values of receiving information from other external systems such as billing or monitoring systems. Sensors in actual data or electronic communication networks can also be used to monitor subscriber, customer, or user behavior.

At step 1608, based upon observed behavior some downstream action is performed. The downstream action might be the execution of a downstream training use case, application of the observed behavior to a reinforcement model (as described above) to get nudges, which are applied back to various systems, or in another example, applying to marketing software that creates promotions or other things that are applied to other systems. It will be appreciated that other examples are possible.

Synthesizing Data Including Images

Figure 17:
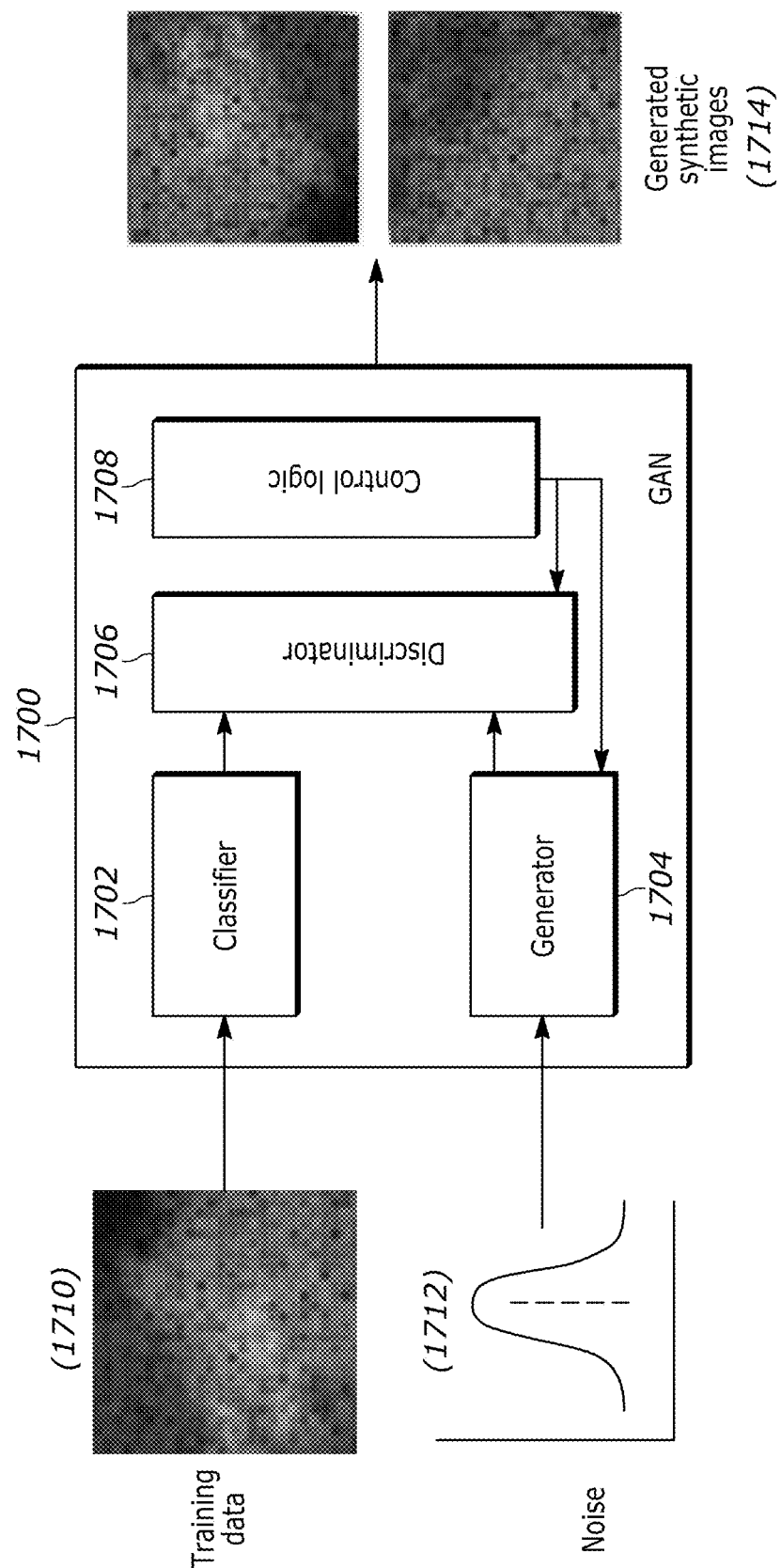
FIG. 17 comprises a diagram showing the components of the synthesis process according to various embodiments of the present invention.

Referring now to FIG. 17, one example of an approach and system 1700 for synthesizing images is described. The synthesized images (which may also be referred to as synthetic images) are the same structure as the other images described herein (which were created from actual user data). Synthesized images of suitable quality are useful in a variety of scenarios. In one example, an application might need large amounts of training data that is not available. In another example, it may be undesirable to use real or actual user data because of the risk that malicious actors might in future deduce information about real users from model behaviors. The system 1700 includes a classifier 1702, an image generator 1704, a discriminator 1706, and control logic 1708.

The classifier 1702 receives actual and real training data 1710 from real and actual users and produces a classification and images that are used when the discriminator 1706 is being trained. The classifier 1702 may be a neural network and CNN to mention a few examples. Once the training of the discriminator 1706 is complete, the classifier 1702 can be removed from the system 1700.

The image generator 1704 generates synthesized or synthetic images. The synthetic images are created from noise 1712. The noise 1712, in examples, may be random numbers that are generated by a random number generator. The image generator 1704 may in examples be a neural network and, more specifically, a CNN. The image generator 1704, when a CNN or neural network, may have weights and other parameters that are adjustable. The synthesized image created by the image generator 1704 includes a classification and is fed to the discriminator 1706. When the discriminator 1706 is being trained, the weights and other parameters of the generator 1704 are not updated and the generator 1704 provides synthetic images for discriminator training. When the discriminator 1706 has been trained the weights and other parameters of the discriminator 1706 are frozen and the generator 1704 is in turn trained, during which time the weights and parameters of the generator 1704 may be adjusted. It may be necessary to repeat this sequence a number of times in order to train a system 1700 to an acceptable level of performance.

The discriminator 1706 is trained by real images generated by the classifier 1702 and synthetic images generated by the generator 1706. Once the discriminator 1706 is trained it is then used to train the image generator 1704, determining whether synthesized images that are received from the generator are close enough in appearance to real images so that they can be passed on for other uses. The discriminator 1706 may produce an answer as an output, for example, that the image is a "good" synthetic image (i.e., it is close enough to be considered a useful image) or a "bad" synthetic image (i.e., it is not close enough to be considered a useful image that can be used for other purposes). In these regards, the discriminator 1706 may produce a numeric score and this along with other information may be transmitted to the control logic 1708.

The control logic 1708 receives information from the trained discriminator 1706, determines whether to pass an image onward (as a generated synthetic image 1714 of suitable quality) and propogates the result back through the discriminator 1706 and the image generator 1704 so that the image generator can train to produce better or more accurate results If the discriminator 1706 and/or the image generator 1704 are CNNs, then weights or other parameters may be calculated and adjusted. When the generator 1704 is being trained this adjustment alters the structures of the generator.

In one example of the operation of the system 1700, the discriminator 1706 is trained with real training images 1710 that have been classified by the classifier 1702. The classifier 1702 is removed once the training process has been completed.

"Noise" or other random information (e.g., random numbers) is applied to the image generator 1706. This creates a synthetic image with a classification and these are fed to the trained discriminator 1706.

The trained discriminator 1706 determines whether and to what degree a presented synthetic image resembles an actual real image to a be useable or not. In other words, the trained discriminator 1706 tries to determine whether a presented image is real or not. For example, the trained discriminator 1706 may detect that an image with certain shades and or colors in certain positions is not realistic.

The control logic 1708 may perform a number of different functions. In some aspects, the control logic 1708 determines whether the synthetic image is an unacceptable or acceptable from information (e.g., scores) it receives from the trained discriminator 1706. As mentioned, the trained discriminator 1706 may also determine whether and to what degree the synthetic image is realistic.

The control logic 1708 may also modify the image generator 1704 based upon the determination about whether the synthetic image is real enough or not. For example, the control logic may determine modifications to the weights of the discriminator 1706 and the image generator 1704. The feedback including weight adjustments is then passed or applied to the image generator 1704 where the structures of these elements are changed. The weight adjustments can be made in some examples by the degree to which the synthetic image is different than real images. The control logic 1708 may also determine to pass the synthetic image as the generated synthetic images 1714. The result is the image generator becomes very good at producing good and useable synthetic images 1714.

Whether a synthetic image is determined to be good (adequate) or bad (not adequate) can be determined in a number of different ways. For example, the overall look and appearance of the synthetic image may be compared to the overall look and appearance of known good images. The look and appearance may refer to areas of shading and transitions between different areas. For example, the bottom right hand corner of known good images may never be a dark black and so synthetic images having this characteristic may be classified as bad or unacceptable because they are too far removed in appearance from could possibly be a good image. In another example, certain colors or shading may never appear in known good images so such appearance in a synthetic image would classify the synthetic image as being nonacceptable. It will be appreciated that the assessment of synthetic images can be done automatically without human intervention, for example using an image classifier as described herein, and that the process by which an image classifier arrives at its decision may be opaque to human understanding.

These images can be used for various purposes such as training other CNNs or neural networks as described herein. In other examples, the synthetic images can be used in the virtual ecosystems described above. In this case, information in the synthetic images can be obtained from the pixels in the synthetic image. This information can be applied directly to the virtual agents of the virtual ecosystem. In other cases, this information can be applied to systems such as billing, accounting, or marketing systems. The billing, accounting, or marketing systems then responsively produce data and this produced data is applied to the virtual agents in the virtual ecosystem. In this way, various products or services can be tested without using actual customer data, and large numbers of tests can be conducted using large amounts of synthetic data. For example, simulations numbering in the thousands or millions can be conducted and the results analyzed without worrying about the security and privacy concerns invoked when actual customer data is used.

Figure 18:
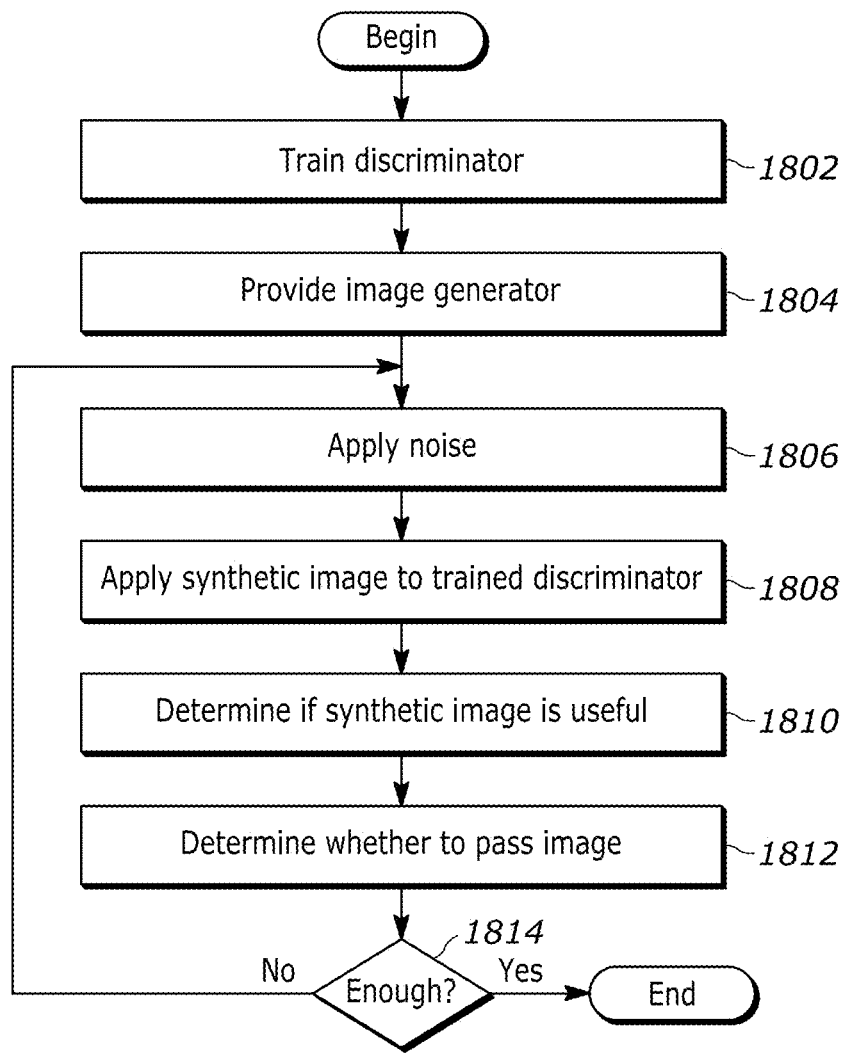
FIG. 18 comprises a flowchart of the synthesis process according to various embodiments of the present invention.

Referring now to FIG. 18, one example of an approach for creating synthetic images is described.

At step 1802, a discriminator is trained with real training images to create a trained discriminator. The images when applied to the discriminator during the training process may be labeled as real or synthetic (or some other classification).

At step 1804, an image generator is provided. In examples, the image generator is a neural network such as a CNN.

At step 1806, noise is applied to the generator and the generator creates a synthetic image. A classification concerning the image may also be produced and electronically attached to the synthetic image.

At step 1808, the synthetic image (and the classification) is applied to the trained discriminator.

At step 1810, a determination is made by the trained discriminator as to whether the image is acceptable or not. The determination may be made by the trained discriminator or by separate control logic (that can be any combination of computer hardware and/or software). The determination may be simply whether or not the synthetic image is acceptable or a score of the image. The score is a measure of how close the image is to known real images.

Based on this determination, at step 1812 a determination is made as to whether to pass the synthetic image onward and whether or how to adjust weights of the generator and/or the discriminator. For example, based upon how bad the image is, weights between different layers in the generator are changed with the amount of adjustment based upon how "bad" the image has been determined to be. In other examples, a mapping table may be used to map proposed changes to specific weights in the image generator.

At step 1814, it is determined whether enough images have been created. For example, the number of images created may be compared to a predetermined threshold (or, in other aspects, a dynamically changing threshold that varies based upon image usage purpose or conditions), or some other criteria may be used to determine whether a sufficient number of images has been created. If the answer at step 1814 is negative, control continues with step 1806. If the answer is affirmative, then execution ends. In some examples, step 1814 may be removed and images may be continuously and endlessly produced.

A variety of applications exist for these type of approaches, including but not limited to, generating data, in the form of images as described elsewhere herein, for the purpose of training models, testing and validating trained models, seeding simulated ecosystems, and seeding and or initializing individual entities in simulated ecosystems, the various downstream use-cases of simulated ecosystems having been described elsewhere herein.

Figure 22:
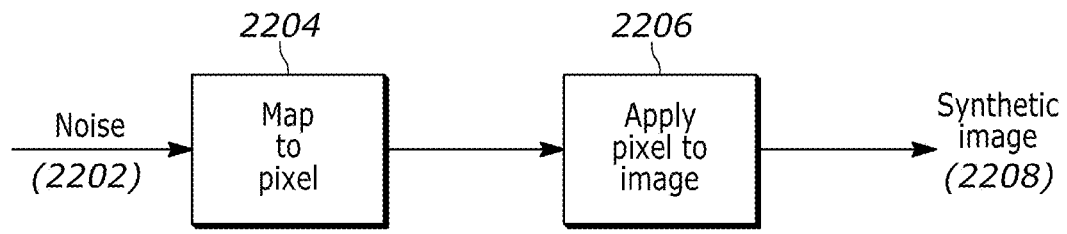
FIG. 22 comprises a flowchart of an example synthetic image generator according to various embodiments of the present invention.

Referring now to FIG. 22, one example of a synthetic image generator 1704 is described. It will be appreciated that this example shows a flowchart but that this logic can be implemented in the form of a neural network such as a CNN where the structure of the neural network performs these functions. It will also be appreciated that this approach can be implemented in any combination of computer software and hardware. It will also be appreciated that the CNN can be adjusted as described elsewhere herein to consistently improve the quality of the synthetic images being created.

Noise 2202 is received and at step 2204 is mapped to a pixel in an image that is being created or formed. For example, the noise may be a specific number (e.g., random number) or a set of such numbers. The input noise may be mapped, through one or more steps, to a grey-scale (or color-code) value for a particular location in the image (pixel location). In one example, the mapping is implemented using a CNN which may have multiple layers. At step 2206, the grey-scale (or color code value) is applied to a pixel in the image. This process continues until a full synthetic image 2208 is created. It will be appreciated that in specific implementations aspects of the sequential process described above may be executed in parallel.

Figure 23:
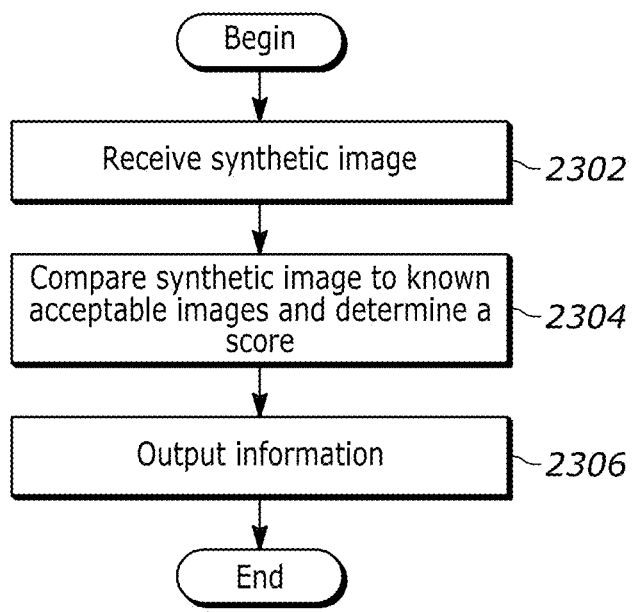
FIG. 23 comprises a flowchart of an example trained discriminator according to various embodiments of the present invention.

Referring now to FIG. 23, one example of a discriminator 1706 is described. It will be appreciated that this example shows a flowchart but that this logic can be implemented in the form of a neural network such as a CNN where the structure of the neural network performs these functions. It will also be appreciated that this approach can be implemented in any combination of computer software and hardware. It will also be appreciated that the implementation can be adjusted as described elsewhere herein to consistently improve the quality of the results of the discriminator even after the discriminator has been initially trained.

At step 2302, the synthetic image is received. In examples and when a CNN is used, this may be at the input layer of the CNN.

At step 2304, the image is analyzed. In this step, the synthetic image is compared to known acceptable images. In examples, a pixel-by-pixel comparison can be made with known acceptable images and the similarities and differences in disposition (coloring or shading, composition, etc.) are determined. It will be appreciated that the assessment of images can be done automatically without human intervention, for example using an image classifier as described elsewhere herein, and that the process by which an image classifier arrives at its decision may be opaque to human understanding.

If the differences are great (e.g., above a threshold), a first number (score) is assigned. If the differences are not as great (e.g., below a threshold) or the images are similar then a second number (score) is assigned. The score is output at step 2306 along with the image and the classification of the image.

Figure 24:
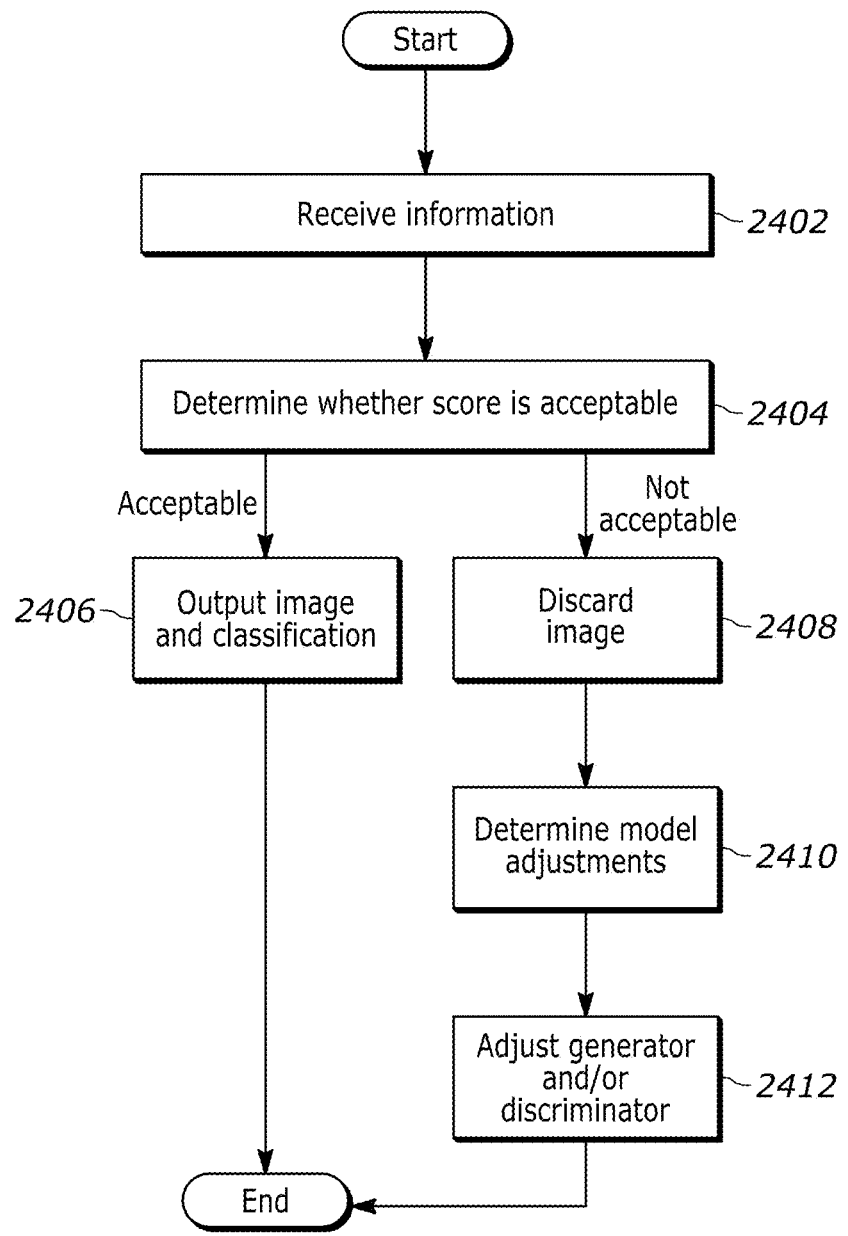
FIG. 24 comprises a flowchart of an example control logic in a synthetic image generation system according to various embodiments of the present invention.

Referring now to FIG. 24, one example of control logic 1708 is described. It will be appreciated that this example shows a flowchart and can be implemented as computer software executed by a controller (e.g., the controller 102) but that this logic can also be implemented in the form of a neural network such as a CNN where the structure of the neural network performs these functions.

At step 2402, the information including the synthetic image, score, and/or classification is received. At step 2404, it is determined whether the score is acceptable. For example, the score may be compared to a predetermined threshold where anything above the threshold is acceptable.

If the answer at step 2404 is that the image is acceptable, then at step 2406 the synthetic image and perhaps a classification are output.

If the answer at step 2404 is that the synthetic image is not acceptable, then at step 2408 the image is discarded. At step 2410, adjustments to the discriminator 1706 and/or the generator 1704 are determined. These adjustments may be, in one example, adjustments to the weights of the generator 1704 when the generator 1704 is a neural network such as a CNN. In some situations, it may be preferable not to alter the discriminator 1706.

Particular weight adjustments can be made in a number of different ways, depending on the implementation In one example, when the discriminator 1706 and the generator 1704 are neural networks such as CNNs, gradients may be calculated by backpropagating the discriminator output through both the discriminator and the generator with these gradients then being used to update the weights of the generator. It will be appreciated that the adjustments can be done automatically without human intervention.

At step 2412, adjustments to the discriminator 1706 and/or the generator 1704 are made. For example, control signals with weight adjustments are sent to the discriminator 1706 and/or the generator 1704 and the physical structure of these elements are changed.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A method, the method comprising:
receiving electronic information relating to one or more of: individual or entity specific information, wherein individual is one of a customer, subscriber, or service user; information concerning a purchase of a product or service; information concerning interaction with an electronic interface, or information concerning one or more systems;
storing a neural network in an electronic memory;
by a control circuit:
creating training images from the received electronic information, wherein the training images comprise a format having a plurality of pixels arranged in a matrix of rows and columns, each of the rows indicative of a time and each of the columns representing a characteristic, the matrix of rows and columns together forming a visual image;
applying the training images to train the neural network creating a trained neural network, the training being effective to modify a structure of the neural network by adjusting weights of the neural network;
subsequent to the completion of the training of the neural network, applying production images having the same format as the training images to the trained neural network, each production image being from a different customer, subscriber, service users or system, and pictorially presenting behavior of each different customer, subscriber, service user or system with respect to a telecommunication or data service, the application of the production images to the trained neural network resulting in the creation of one or more control signals by the trained neural network;
wherein the control signals include information indicating one or more of: a classification of each different customer, subscriber, service user, a type of behavior of each different customer, subscriber, or service user, or a classification of system state or behavior for a system delivering a telecommunications system or data service;
wherein the one or more control signals are effective to cause an action to be performed, the action be one or more of:
control of an operation of a machine after the machine receives the one or more control signals;
create an electronic message that is sent to a selected customer, subscriber, service user or administrator of the telecommunication or data service;
automatically produce of a report that is electronically presented to a selected customer or an administrator of the telecommunication service;
control of a switch or other physical or virtual device in a network that implements the telecommunication or data service; automatic addition to or modification of a customer or subscriber service profile or entitlement, automatic addition to or modification of a service or product definition, automatic creation of a new service or product definition, or
automatically create a marketing message that is electronically sent to a selected customer, user, or subscriber.

2. The method of claim 1, wherein the electronic information comprises customer spend information, customer system interaction information, or customer system usage information of the telecommunication or data service.

3. The method of claim 1, wherein the training images and the production images further include non-customer information, the non-customer information being macroeconomic information, weather information, sentiment information, market information, service information, system information, or key performance indicator information.

4. The method of claim 1, wherein the neural network is a convolutional neural network (CNN).

5. The method of claim 1, wherein the image is encoded in a PNG, TIF or JPEG image format.

6. The method of claim 1, wherein the customer characteristic is propensity to churn, propensity to remain, propensity to commit fraud, propensity to spend, propensity to upgrade, or propensity to accept promotions.

7. The method of claim 1, wherein the training images and production images include pixels that are grey-scale coded or color coded.

8. The method of claim 1, wherein the electronic information included in the training images and production images has been mapped, normalized and/or smoothed.

9. The method of claim 1, wherein the time is a tunable parameter and represents one or more years, one or more months, one or more weeks, one or more days, one or more hours, or one or more minutes.

10. The method of claim 1, wherein subsequent to the training further adjustments are made to the trained neural network.

11. A system, the system comprising:
a receiver circuit that is configured to receive electronic information relating to one or more of: individual or entity specific information, wherein individual is one of a customer, subscriber, or service user; information concerning a purchase of a product or service; information concerning one or more systems, or information concerning interaction with an electronic interface;
an electronic memory and a neural network stored in the electronic memory;
a control circuit coupled to the receiver circuit and the electronic memory, the control circuit configured to create training images from the electronic information;
wherein the training images comprise a format having a plurality of pixels arranged in a matrix of rows and columns, each of the rows indicative of a time and each of the columns representing a customer characteristic, the matrix of rows and columns together forming a visual image;
wherein the training images are applied to train the neural network creating a trained neural network, the training being effective to modify a structure of the neural network by adjusting weights of the neural network;
wherein subsequent to the completion of the training of the neural network, production images having the same format as the training images are applied to the trained neural network, each production image being from a different customer, subscriber, service user or system and pictorially presenting behavior and or state of each different customer, subscriber, service user or system with respect to a telecommunication or data service, the application of the production images to the trained neural network resulting in the creation of one or more control signals by the trained neural network;
wherein the control signals include information indicating one or more of: a classification of each different customer, subscriber, service user, a type of behavior of each different customer, subscriber, or service user, or a classification of system state or behavior for a system delivering a telecommunications system or data service;
wherein the one or more control signals are effective to cause an action to be performed, the action be one or more of:
control of an operation of a machine after the machine receives the one or more control signals;
creation of an electronic message that is sent to a selected customer, subscriber, or service user or an administrator of the telecommunication or data service;
automatic production of a report that is electronically presented to a selected customer, subscriber or service user or an administrator of the telecommunication or data service;
control of a switch or other physical or virtual device in a network that implements the telecommunication or data service; automatic addition to or modification of a customer or subscriber service profile or entitlement, automatic addition to or modification of a service or product definition, automatic creation of a new service or product definition, or
automatic creation of a marketing message that is electronically sent to a selected customer, subscriber, or user.

12. The system of claim 11, wherein the electronic information comprises customer spend information, customer system interaction information, or customer system usage information of the telecommunication or data service.

13. The system of claim 11, wherein the training images and the production images further include non-customer information, the non-customer information being macroeconomic information, weather information, sentiment information, service information, system information, market information, or key performance indicator information.

14. The system of claim 11, wherein the neural network is a convolutional neural network (CNN).

15. The system of claim 11, wherein the image is encoded in a PNG, TIF or JPEG image format.

16. The system of claim 11, wherein the customer characteristic is propensity to churn, propensity to remain, propensity to commit fraud, propensity to spend, propensity to upgrade, or propensity to accept promotions.

17. The system of claim 11, wherein the training images and production images include pixels that are grey-scale coded or color coded.

18. The system of claim 11, wherein the electronic information included in the training images and production images has been mapped, normalized and/or smoothed.

19. The system of claim 11, wherein time is a tunable parameter and may represent one or more years, one or more months, one or more weeks, one or more days, or one or more hours.

20. The system of claim 11, wherein subsequent to the training further adjustments are made to the trained neural network.

* * * * *